United States Patent
Kimura

(10) Patent No.: US 10,865,814 B2
(45) Date of Patent: Dec. 15, 2020

(54) HYDRAULIC ACTUATOR

(71) Applicant: Ogura & Co., Ltd., Kanagawa (JP)

(72) Inventor: Kiyoshi Kimura, Ebina (JP)

(73) Assignee: OGURA & CO., LTD., Kanagawa (JP)

( * ) Notice: Subject to any disclaimer, the term of this patent is extended or adjusted under 35 U.S.C. 154(b) by 151 days.

(21) Appl. No.: 16/148,262

(22) Filed: Oct. 1, 2018

(65) Prior Publication Data

US 2019/0145434 A1     May 16, 2019

(30) Foreign Application Priority Data

Nov. 15, 2017   (JP) ................. 2017-220052

(51) Int. Cl.
| | | |
|---|---|---|
| F15B 13/042 | (2006.01) | |
| F16H 25/18 | (2006.01) | |
| F16K 11/14 | (2006.01) | |
| F15B 11/10 | (2006.01) | |
| F15B 13/04 | (2006.01) | |

(52) U.S. Cl.
CPC .......... F15B 13/0422 (2013.01); F15B 11/10 (2013.01); F15B 13/0402 (2013.01); F16H 25/186 (2013.01); F16K 11/14 (2013.01)

(58) Field of Classification Search
CPC .............. F15B 13/0422; F15B 13/0402; F16H 25/186; F16K 11/14
See application file for complete search history.

(56) References Cited

U.S. PATENT DOCUMENTS

| 8,656,711 B2 * | 2/2014 | Richter et al. ........ E02F 9/2296 60/433 |
| 9,856,890 B2 * | 1/2018 | Tsutsui et al. ............ F04B 5/02 |
| 2016/0377098 A1 * | 12/2016 | Nakamura et al. .................. F15B 13/0402 137/625.69 |
| 2020/0094332 A1 * | 3/2020 | Kimura .................. B23D 15/02 |

FOREIGN PATENT DOCUMENTS

| JP | 2004-17202 | 1/2004 |
| JP | 2010-280011 | 12/2010 |

* cited by examiner

*Primary Examiner* — Kevin L Lee
(74) *Attorney, Agent, or Firm* — Greenblum & Bernstein, P.L.C.

(57) ABSTRACT

A hydraulic actuator includes a switching part that is provided with an oil passage for sending pressurized oil generated by a hydraulic pump to a tool and returning return oil from the tool to the hydraulic pump. The switching part switches a route of at least one of the pressurized oil and the return oil. The switching part includes an operating portion (for example, an operation knob) and an axis portion (for example, a spool) that advances or retreats when the operating portion is turned. When the operating portion is turned, the axis portion advances or retreats in a direction orthogonal to a direction of turning the operating portion, whereby the route of the oil passage is switched.

5 Claims, 20 Drawing Sheets

HYDRAULIC ACTUATOR

CROSS-REFERENCE TO RELATED APPLICATION

This application claims priority to Japanese Patent Application No. 2017-220052 filed on Nov. 15, 2017, the entire contents of which are incorporated herein by reference.

BACKGROUND OF THE INVENTION

1. Field of the Invention

The present invention relates to a hydraulic actuator that is operated by oil pressure.

2. Description of the Related Art

Conventionally, portable hydraulic actuators have been used for rescue applications. An example of such a hydraulic actuator is disclosed in Japanese Patent Application Laid-Open No. 2010-280011 (JP2010-280011A). The hydraulic actuator disclosed in Japanese Patent Application Laid-Open No. 2010-280011 includes a battery, an oil pressure generating unit including an electric motor that receives power supplied from the battery and a hydraulic pump that is driven by the electric motor, and a head unit that can be detachably attached to the oil pressure generating unit and including a tip tool driven by pressurized oil generated by the oil pressure generating unit. Various types of devices such as a cutter, a spreader and the like have been prepared as the tip tool provided with the head unit and it is possible to cope with various kind of work by replacing the head unit.

Moreover, by making the oil pressure generating unit and the head unit separable from each other, portability is improved, and a load of an operator on site can be reduced.

In the conventional hydraulic actuator, a route of the pressurized oil and return oil in an oil passage is switched by a spool valve, when sending the pressurized oil generated by the hydraulic pump to the tip tool and returning the return oil from the tip tool to the hydraulic pump (See, for example, Japanese Patent Application Laid-Open No. 2004-17202 (JP2004-17202A)). Specifically, in the conventional hydraulic actuator disclosed in Japanese Patent Application Laid-Open No. 2004-17202 and the like, the spool valve is disposed to be slidable in a direction orthogonal to a piston rod. Also, on an outside of a casing, a columnar grip handle grasped by the operator's hand is mounted parallel to the piston rod. Note that the grip handle is rotatable around an axis line of the grip handle. In addition, a plurality of cam mechanisms is provided between the spool valve and the grip handle. Then, when the operator turns the grip handle, a rotational movement of the grip handle is converted by the cam mechanisms into an advancing and retreating movement of the spool valve. As the spool valve moves up and down with respect to the piston rod, the flow direction of the pressurized oil and the like is controlled.

SUMMARY OF INVENTION

In the spool valve of the conventional hydraulic actuator disclosed in Japanese Patent Application Laid-Open No. 2004-17202 and the like, the grip handle is provided to extend in the direction orthogonal to the advancing and retreating direction of the spool valve, and the grip handle is rotatable around the axis line of this grip handle. For this reason, in the conventional hydraulic actuator, the installation space of the grip handle increases. As a result, the hydraulic actuator becomes large, and weight and cost of the hydraulic actuator increase.

The present invention has been made in view of the above discussion. One object of the present invention is to provide a hydraulic actuator in which the mechanism for switching the route of the pressurized oil and return oil in the oil passage is not complicated and then it can be made compact and inexpensive with a simple configuration.

A hydraulic actuator of the present invention includes: a hydraulic pump that generates pressurized oil; a tool that is operated by the pressurized oil generated by the hydraulic pump; an oil passage for sending the pressurized oil generated by the hydraulic pump to the tool and returning return oil from the tool to the hydraulic pump; a switching part provided with the oil passage and configured to switch a route of at least one of the pressurized oil and the return oil, the switching part includes an operating portion and an axis portion that advances or retreats when the operating portion is turned, and when the operating portion is turned, the axis portion advances or retreats in a direction orthogonal to a direction of turning the operating portion, whereby the route of the oil passage is switched.

In the hydraulic actuator of the present invention, the switching part may further comprise a converting member for converting a rotational movement of the operating portion into an advancing and retreating movement of the axis portion.

In the hydraulic actuator of the present invention, the operating portion, the converting member and the axis portion may rotate to be in a same phase, a groove extending in a direction inclined with respect to a circumferential direction and an advancing and retreating direction of the axis portion may be formed on an outer peripheral surface of the axis portion, and a fixing member provided in a fixed position may be inserted in the groove.

In the hydraulic actuator of the present invention, the axis portion of the switching part may be provided with a first groove extending along a circumferential direction of the axis portion, and when the axis portion advances or retreats by turning the operating portion, the route in the oil passage may be switched by changing the position of the first groove.

In the hydraulic actuator of the present invention, a hole into which the axis portion of the switching part is inserted may be formed in a main portion of the hydraulic actuator, a second groove extending along a circumferential direction of the hole may be provided on a peripheral wall of the hole, and when the axis portion advances or retreats by turning the operating portion, the route in the oil passage may be switched by opening the second groove that has been blocked by the axis portion or blocking the second groove by the axis portion.

DESCRIPTION OF EMBODIMENT

Figure 1:
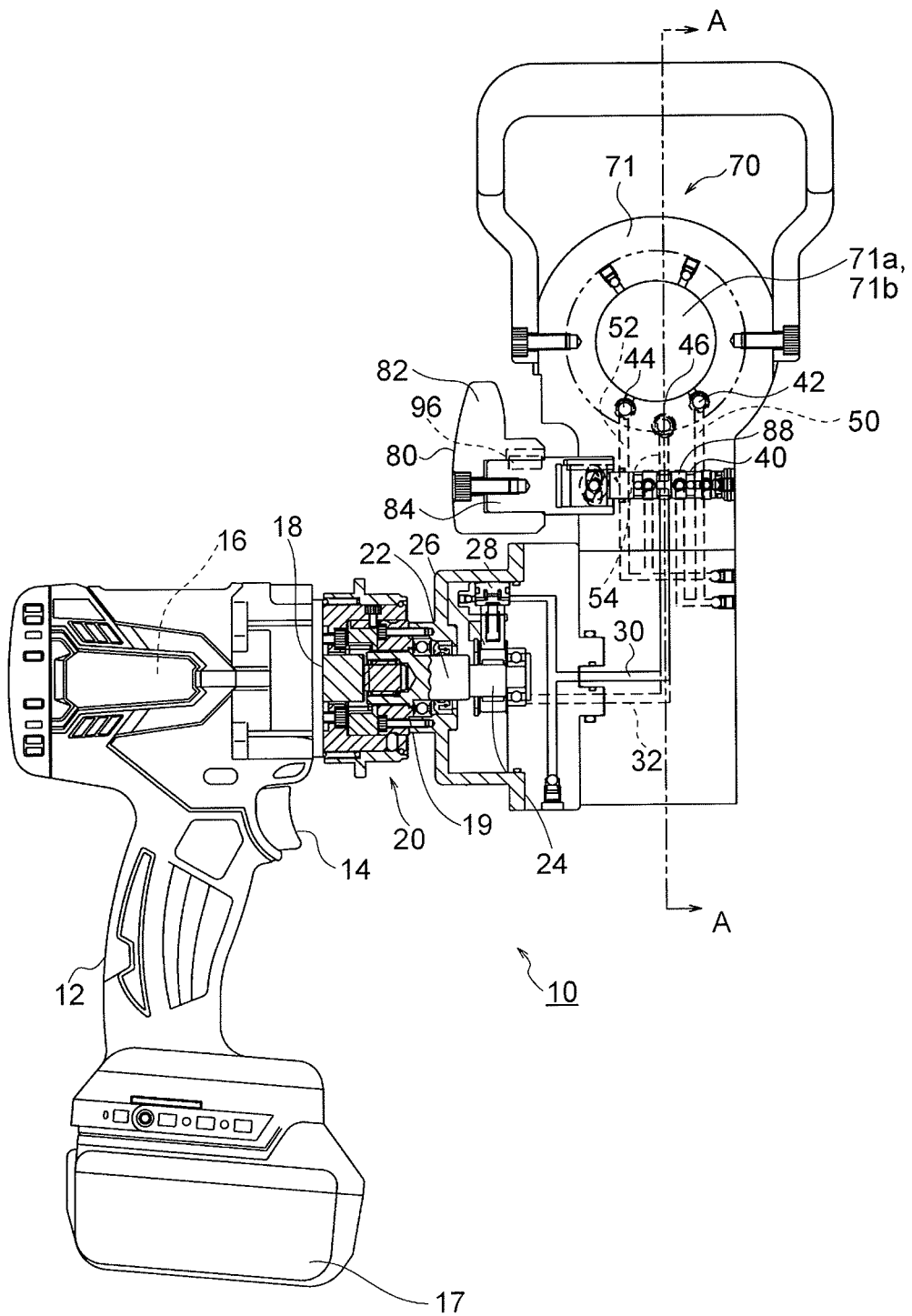
FIG. 1 is a front view partially showing an internal configuration of a hydraulic actuator according to an embodiment of a present invention.
Figure 2:
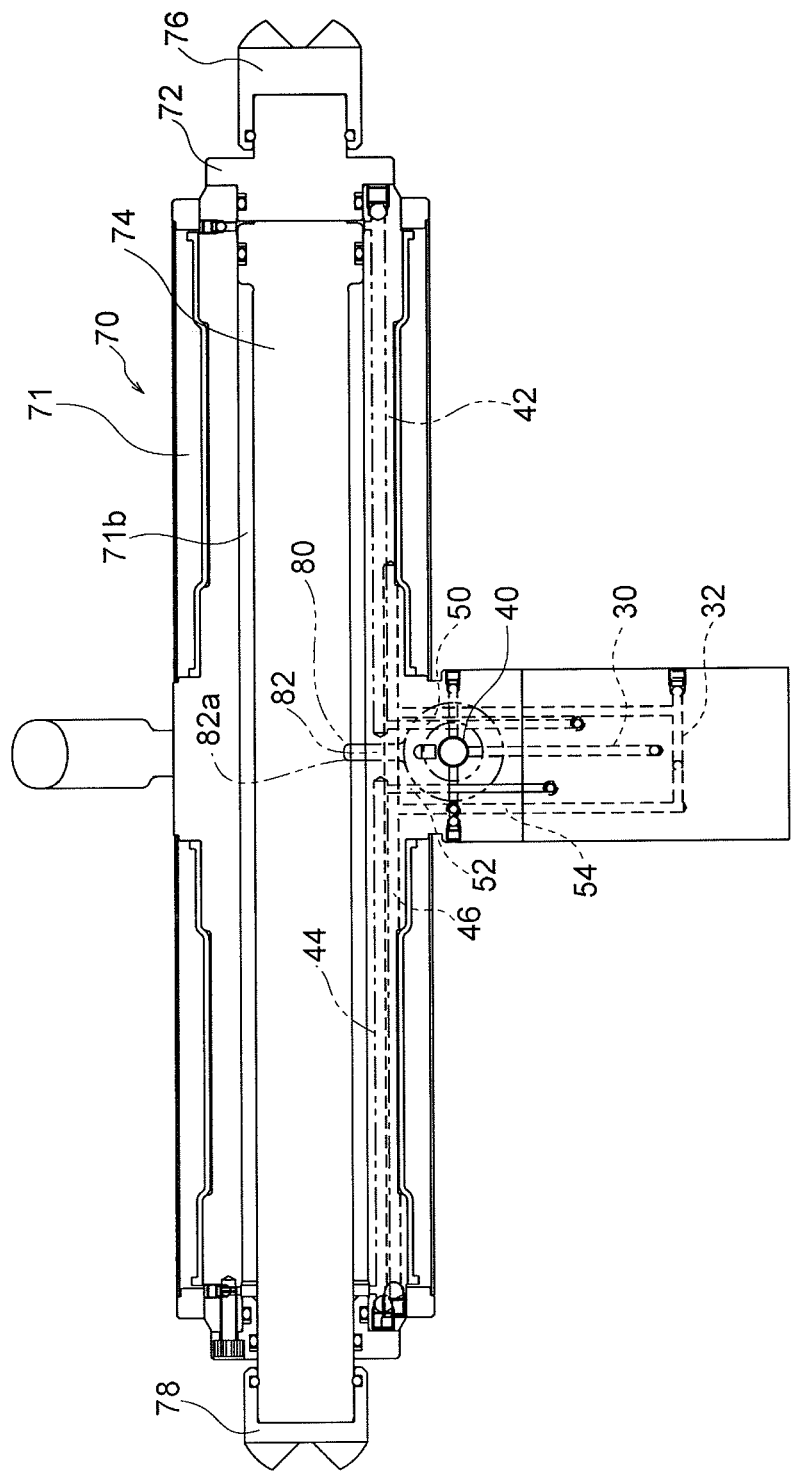
FIG. 2 is a side view of the hydraulic actuator shown in FIG. 1, taken along an arrow line A-A.
Figure 3:
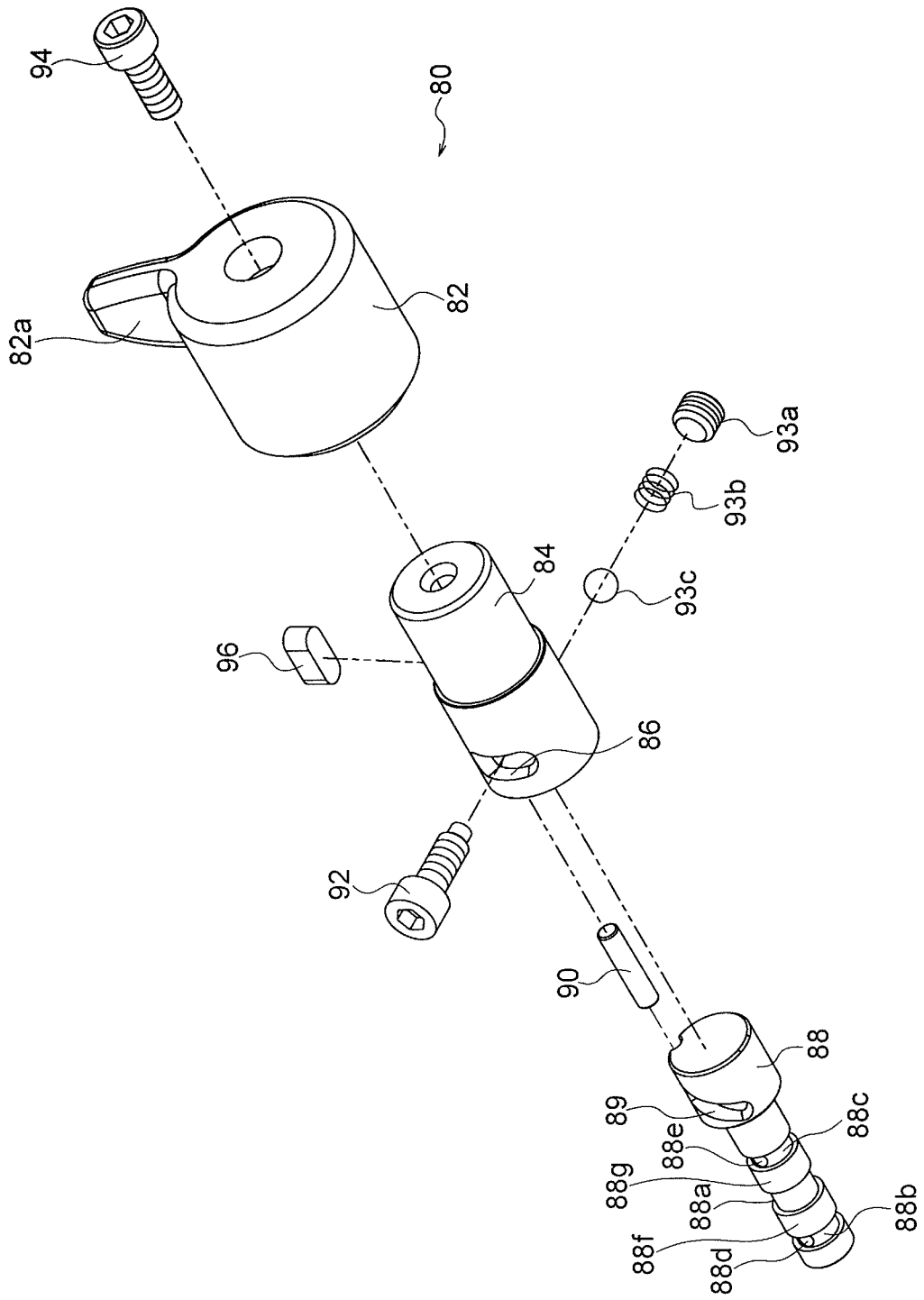
FIG. 3 is an exploded perspective view showing a configuration of each component of a switching part in the hydraulic actuator shown in FIG. 1.

Hereinafter, an embodiment of a present invention will be described with reference to the drawings. A hydraulic actuator according to the present embodiment is used for rescue and the like, and it is possible to cut an object such as a reinforcing steel by a tip tool such as a spreader or break open a gap of an object such as a door. FIGS. 1 to 15 are views showing the hydraulic actuator according to the present embodiment. Among them, FIG. 1 is a front view partially showing an internal configuration of the hydraulic actuator according to the present embodiment, FIG. 2 is a side view taken along an arrow line A-A in the hydraulic actuator shown in FIG. 1, and FIG. 3 is an exploded perspective view showing the constitution of each component of the switching part in the hydraulic actuator shown in FIG. 1. FIGS. 4 to 7 are diagrams showing the internal configuration, a state and the like of the switching part when the spool of the switching part is positioned at a forward position in the hydraulic actuator shown in FIG. 1. FIGS. 8 to 11 are diagrams showing the internal configuration, the state and the like of the switching part when the spool of the switching part is positioned at a neutral position in the hydraulic actuator shown in FIG. 1. FIGS. 12 to 15 are diagrams showing the internal configuration, the state and the like of the switching part when the spool of the switching part is positioned at a backward position in the hydraulic actuator shown in FIG. 1. It should be noted that, in FIGS. 4 to 15, pressurized oil to be sent from the hydraulic pump to the tip tool is indicated by a solid line, and return oil to be returned from the tip tool to the hydraulic pump is indicated by a two-dot chain line. In addition, in FIGS. 1 to 15, in order to make it easy to see the oil passages of the pressurized oil and return oil arranged between the hydraulic pump and the tip tool and the switching part, a depiction of a hatch to show a section around the oil passage and the switching part is omitted.

As shown in FIG. 1 and the like, a hydraulic actuator 10 according to the present embodiment includes a handle 12 for an operator to grasp by hand, a switch 14 operated by a finger of the operator grasping the handle 12 with the hand, a motor 16 such as an electric motor, a battery 17 composed of a secondary battery such as a lithium ion battery or a nickel hydrogen battery, a hydraulic pump 20 driven by the motor 16, and a tip tool 70 operated by the pressurized oil generated by the hydraulic pump 20. When the switch 14 is operated by the finger of the operator grasping the handle 12 by hand, power is supplied from the battery 17 to the motor 16, and a rotation axis 18 attached to the motor 16 is rotated by the motor 16. At a tip of the rotation axis 18, an insertion part 19 to be inserted into a rotating member 22 of the hydraulic pump 20 to be described later is provided.

The hydraulic pump 20 includes an oil chamber 28, the cylindrical rotating member 22, an eccentric member 24 attached to a tip of the rotating member 22, and a piston 26 that moves up and down as the eccentric member 24 rotates. The eccentric member 24 is eccentric with respect to an axis line of the rotating member 22. A bearing such as a needle roller bearing is attached to an outer peripheral surface of the eccentric member 24. The piston 26 is constantly pressed toward an outer peripheral surface of the bearing by a spring (not shown). Therefore, when the rotating member 22 rotates, the eccentric member 24 and the bearing eccentrically rotate with respect to the axis line of the rotating member 22, whereby the piston 26 moves up and down.

Then, the pressurized oil is sent from the oil chamber 28 toward the tip tool 70 to be described later, and the tip tool 70 is operated.

As shown in FIGS. 1, 2 and the like, a plurality of oil passages 30, 32, 50, 52 and 54 are provided inside the hydraulic actuator 10 in order to send the pressurized oil from the oil chamber 28 of the hydraulic pump 20 to the tip tool 70 and to return the return oil from the tip tool 70 to the oil chamber 28. Among the plurality of oil passages 30, 32, 50, 52 and 54, a first oil passage 30 is a feed pipe through which the pressurized oil passes from the oil chamber 28 of the hydraulic pump 20 to the tip tool 70, and a second oil passage 32 is a return pipe through which the return oil returned from the tip tool 70 to the oil chamber 28 passes. The first oil passage 30 and the second oil passage 32 respectively communicate with a hole 40 into which a spool 88 of a switching part 80 (specifically, a spool valve) to be described later is inserted. Among the plurality of oil passages 30, 32, 50, 52 and 54, a third oil passage 50 is connected to a feed pipe 42 which sends the pressurized oil to a first oil chamber 71a of the tip tool 70 which will be described later, and a fourth oil passage 52 is connected to a feed pipe 44 which sends the pressurized oil to a second oil chamber 71b of the tip tool 70 to be described later. A fifth oil passage 54 is connected to a drain pipe 46 (to be described later) to which the oil drained from the tip tool 70 is sent. These third oil passage 50, fourth oil passage 52 and fifth oil passage 54 also communicate with the hole 40 into which the spool 88 of the switching part 80 to be described later is inserted. By the switching part 80, the oil passage communicating with each of the first oil passage 30 and the second oil passage 32 is switched to one of the third oil passage 50, the fourth oil passage 52 and the fifth oil passage 54. Details of the configuration of such switching part 80 will be described later.

Next, a configuration of the tip tool 70 will be described in detail with reference to FIG. 2 and the like. The tip tool 70 includes an elongated cylindrical cylinder 71, a pair of heads 76, 78 respectively provided at both ends of the cylinder 71, a mounting member 72 for mounting one head 76 on one end of the cylinder 71, and a piston member 74 provided inside the cylinder 71 and to which the other head 78 is attached at the tip. When the pressurized oil is sent from the oil chamber 28 of the hydraulic pump 20 to the tip tool 70, the piston member 74 is pushed out to a left side in FIG. 2. When the piston member 74 is pushed out to the left side in FIG. 2, the head 78 advances in a left direction in FIG. 2, and a distance between the heads 76, 78 increases. By inserting the heads 76, 78 in the gap of the object to be broken open by the tip tool 70, and by sending the pressurized oil from the oil chamber 28 of the hydraulic pump 20 to the tip tool 70, the distance between the heads 76, 78 can be increased and it is possible to widen the gap of the object.

More specifically, in the tip tool 70, the first oil chamber 71a and the second oil chamber 71b are formed inside the cylinder 71. Although the first oil chamber 71a is not shown in FIG. 2, the first oil chamber 71a is formed between a root portion of the piston member 74 and the mounting member 72. When the pressurized oil is sent from the third oil passage 50 to the first oil chamber 71a via the feed pipe 42, the piston member 74 moves to the left side in FIG. 2. The second oil chamber 71b is provided inside the cylinder 71 on a side opposite to the first oil chamber 71a across the root portion of the piston member 74. When the pressurized oil is sent from the fourth oil passage 52 to the second oil chamber 71b via the feed pipe 44, the piston member 74 moves to the right side in FIG. 2.

Next, the configuration of the switching part 80 will be described in detail with reference to FIGS. 1 to 3. The switching part 80 includes a substantially disc-shaped operation knob 82 (operating portion) operated by the operator, a substantially cylindrical operation knob mounting part 84 to which the operation knob 82 is attached, and the elongated columnar spool 88 (axis portion) inserted into a hollow portion of the operation knob mounting part 84. When the operation knob 82 is turned by the operator, the spool 88 advances and retreats in a direction orthogonal to a direction in which the operation knob 82 is turned (that is, a direction along the paper surface of FIG. 2). That is, the spool 88 advances and retreats in a lateral direction in FIG. 1. More specifically, the operation knob 82 is formed with a projecting portion 82a which is grasped by the finger of the operator, and the operator can turn the operation knob 82 by grasping the projecting portion 82a with the finger. When the operation knob 82 is positioned at the neutral position to be described later, the projecting portion 82a is oriented upward as shown in FIG. 2. When the operation knob 82 is turned so that the operator knocks down the projecting portion 82a in such a manner as to be knocked down in either a left or a right direction in FIG. 2, the operation knob 82 is positioned at the forward position or the backward position. As shown in FIG. 3, the operation knob 82 is attached to the operation knob mounting part 84 by a bolt 94, and the operation knob 82 and the operation knob mounting part 84 rotate integrally. The operation knob mounting part 84 is provided with a stopper groove 86 and a bolt 92 is inserted into this stopper groove 86. The bolt 92 is provided in a fixed position in the hydraulic actuator 10. The rotation angle of the operation knob 82 and the operation knob mounting part 84 can be limited within a predetermined range by the stopper groove 86 into which the bolt 92 provided at the fixed position in the hydraulic actuator 10 is inserted. Specifically, the rotation angle of the operation knob 82 and the operation knob mounting part 84 can be limited to, for example, 60°.

On an outer peripheral surface of the spool 88, a lead groove 89 inclined with respect to a circumferential direction and an axial direction of the spool 88 is formed, and a tip portion of the bolt 94 is inserted into the lead groove 89. As the tip portion of the bolt 92 provided at the position fixed to the hydraulic actuator 10 is inserted into the lead groove 89 which is inclined with respect to the axis direction of the spool 88, when the operation knob mounting part 84 rotates, the spool 88 advances and retreats along the axis direction (that is, the lateral direction in FIG. 1). On the outer peripheral surface of the spool 88, a groove is formed in which an elongated columnar positioning pin 90 is inserted. With this positioning pin 90, it is possible to prevent the position of the spool 88 in the circumferential direction from deviating from the operation knob mounting part 84. That is, the operation knob mounting part 84 and the spool 88 rotate in a same phase. A plurality of grooves 88a, 88b, 88c (first groove) is formed in the spool 88, and holes 88d, 88e are provided in the respective grooves 88b, 88c. A hollow portion extending along the axis direction is formed inside the spool 88, and each hole 88d, 88e communicates with this hollow portion. A first outer wall portion 88f extending in the circumferential direction is formed between the groove 88a and the groove 88b, and a second outer wall portion 88g extending in the circumferential direction is formed between the groove 88b and the groove 88c.

Figure 6:
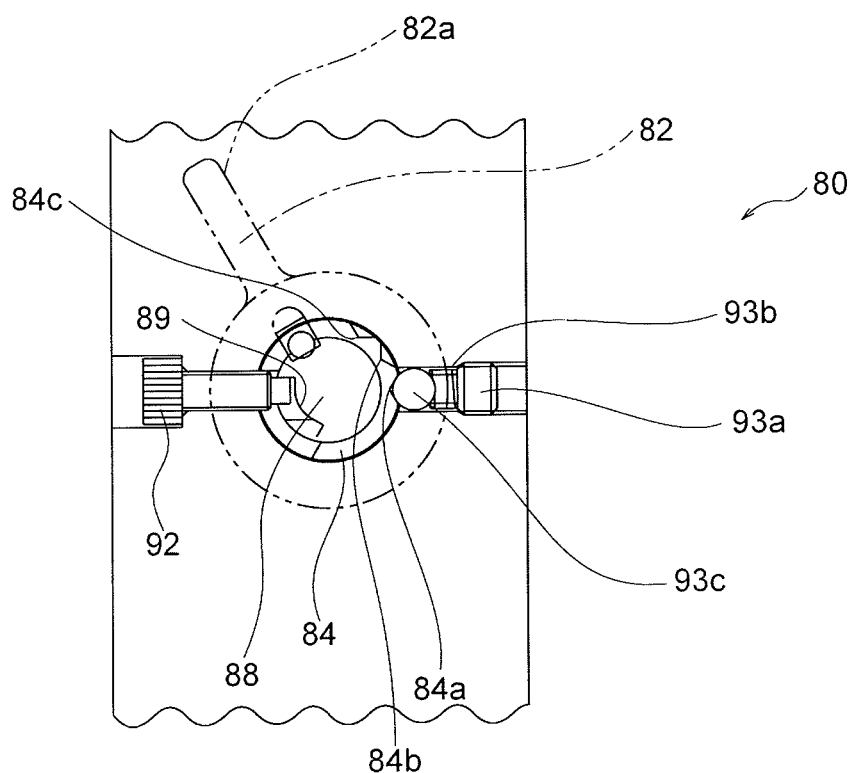
FIG. 6 is a diagram showing a state of the switching part when the spool of the switching part is positioned at the forward position in the hydraulic actuator shown in FIG. 1.

As shown in FIG. 6 and the like, three grooves 84a, 84b, and 84c are formed on the outer peripheral surface of the operation knob mounting part 84. In addition, as shown in FIGS. 3, 6 and the like, a steel ball 93c entering one of the three grooves 84a, 84b, and 84c and a bolt 93a which presses the steel ball 93c by a spring 93b toward the operation knob mounting part 84 are provided, respectively. The steel ball 93c is pressed toward the operation knob mounting part 84 via the spring 93b by the bolt 93a, whereby this steel ball 93c enters into one groove of the three grooves 84a, 84b, and 84c. As a result, the operation knob mounting part 84 is positioned at one of the forward position, the neutral position and the backward position. Here, the groove 84a corresponds to the forward position, the groove 84b corresponds to the neutral position, and the groove 84c corresponds to the backward position.

The switching part 80 having such a configuration is adapted to function as a so-called spool valve.

Figure 4:
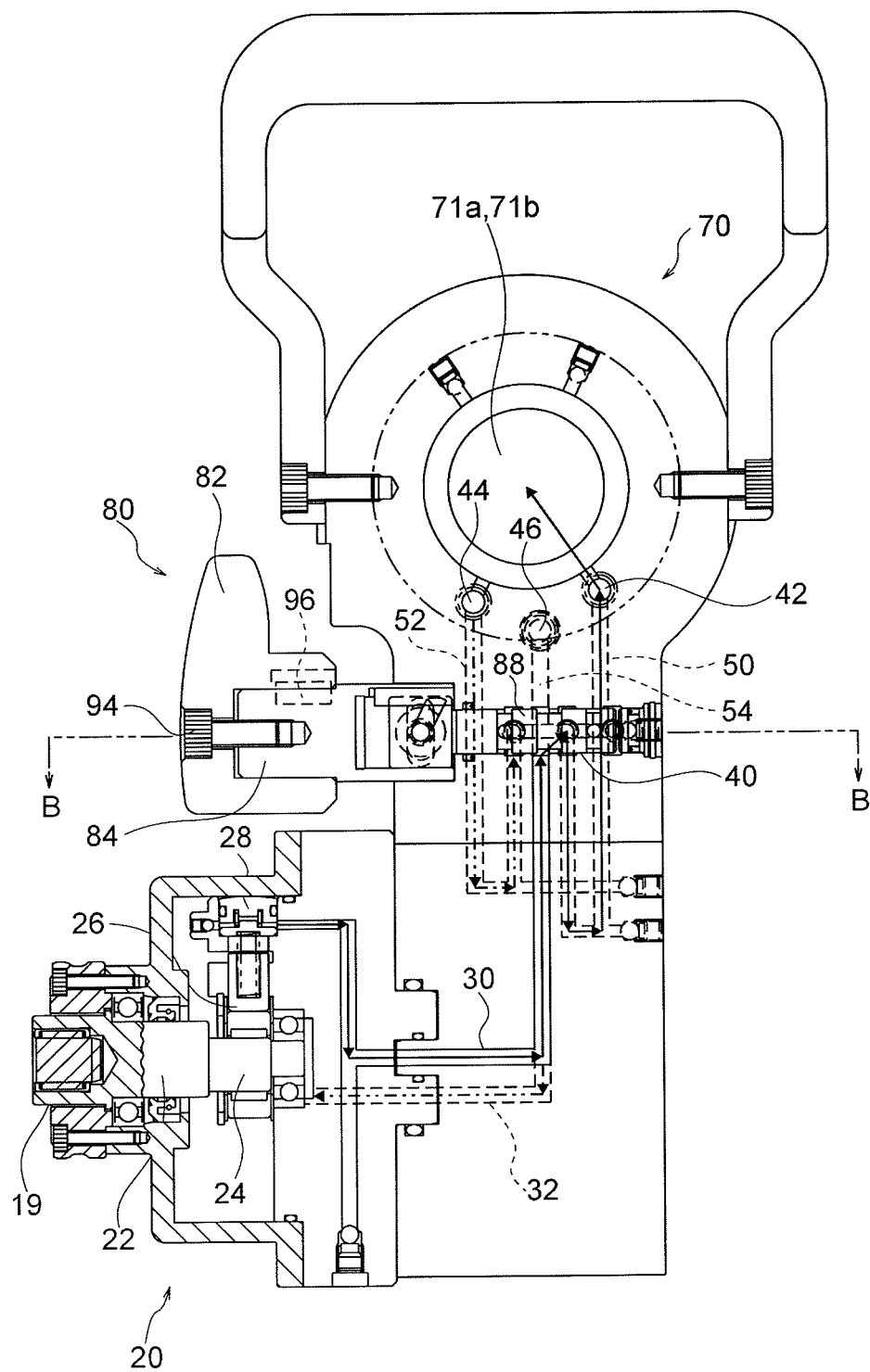
FIG. 4 is a view showing the internal configuration when a spool of the switching part is positioned at a forward position in the hydraulic actuator shown in FIG. 1.
Figure 5:
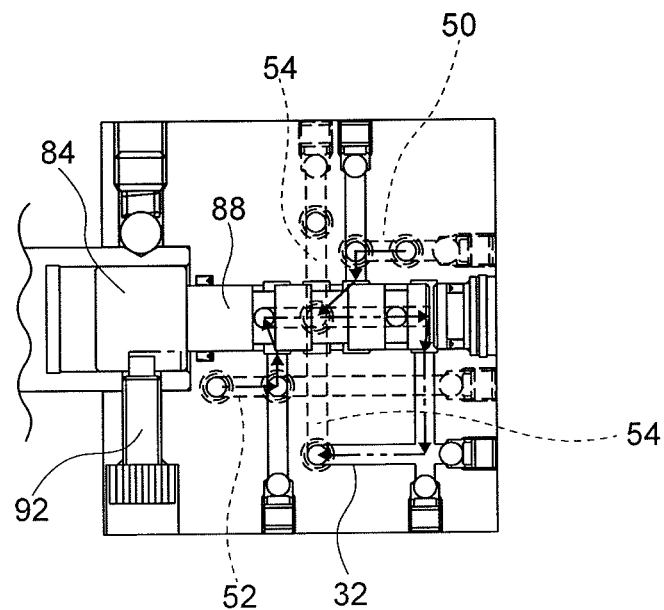
FIG. 5 is a view showing the internal configuration of the hydraulic actuator shown in FIG. 4 taken along an arrow line B-B.

As shown in FIGS. 1, 4 and the like, the hole 40 into which the spool 88 of the switching part 80 is inserted is provided in the hydraulic actuator 10. The oil passage 30, 32, 50, 52 and 54 communicate with this hole 40, respectively. As shown in FIGS. 1, 4 and the like, a plurality of grooves (second grooves) extending along the circumferential direction of the hole 40 is also formed on a peripheral wall of the hole 40. When the operation knob mounting part 84 is located at the neutral position, several grooves are blocked by each outer wall portion 88f, 88g of the spool 88. On the other hand, when the operation knob mounting part 84 is positioned at the forward position or the backward position, all the grooves are opened without being blocked by the respective outer wall portions 88f, 88g of the spool 88. In the present embodiment, the position of the spool 88 in the lateral direction in FIG. 1 changes depending on positions of the operation knob 82 and the operation knob mounting part 84. Therefore, the oil passage communicating with each of the first oil passage 30 and the second oil passage 32 is switched from among the third oil passage 50, the fourth oil passage 52 and the fifth oil passage 54

Next, the operation of the hydraulic actuator 10 having such a configuration will be described below.

First, with reference to FIGS. 4 to 7, description will be given of an operation when the gap of the object is broken open by the tip tool 70. When opening the gap of the object with the tip tool 70, the operator turns the operation knob 82 so that the operation knob 82 moves from the neutral position to the forward position. Specifically, when the hydraulic actuator 10 is on standby, the operation knob 82 is positioned at the neutral position, and the projecting portion 82a of the operation knob 82 is oriented upward as shown in FIG. 2. From this state, when the operator turns the operation knob 82 in the counterclockwise direction in FIG. 2 so that the operator knocks down the projecting portion 82a to the left in FIG. 2, the operation knob 82 is located at the forward position. Specifically, as shown in FIG. 6, when the operation knob 82 is turned to the forward position, the operation knob mounting part 84 also rotates integrally. Then, among the three grooves 84a, 84b, 84c provided on the outer peripheral surface of the operation knob mounting part 84, the steel ball 93c enters the groove 84a, whereby the operation knob mounting part 84 is positioned at the forward position.

A tip portion of the bolt 92 provided at the position fixed to the hydraulic actuator 10 is inserted into the lead groove 89 which is inclined with respect to the axis direction of the spool 88. Therefore, when the operation knob mounting part 84 rotates counterclockwise in FIGS. 2 and 6, the tip portion of the bolt 92 relatively moves inside the lead groove 89. As a result, the spool 88 moves in the right direction in FIGS. 1, 4 and 7 along the axis direction. As described above, when the spool 88 moves in the right direction in FIGS. 1, 4 and 7 along the axis direction, the positions of the respective grooves 88a, 88b, 88c provided on the outer peripheral surface of the spool 88 change and the groove of the peripheral wall of the hole 40 that has been blocked by the spool 88 is opened. As a result, the first oil passage 30 and the third oil passage 50 as the feed pipe communicate with each other (see FIG. 4). Thereafter, when the hydraulic pump 20 is operated and the pressurized oil is sent from the oil chamber 28 of this hydraulic pump 20 to the first oil passage 30, the pressurized oil is sent from the third oil passage 50 to the first oil chamber 71a of the tip tool 70 via the feed pipe 42. When the pressurized oil is sent from the third oil passage 50 to the first oil chamber 71a via the feed pipe 42, the piston member 74 moves to the left side in FIG. 2 and the head 78 advances in the left direction in FIG. 2. This increases the distance between the heads 76, 78. As described above, the distance between the heads 76, 78 caught in the gap of the object to be broken open by the tip tool 70 is increased, so that the gap of the object can be expanded.

Figure 7:
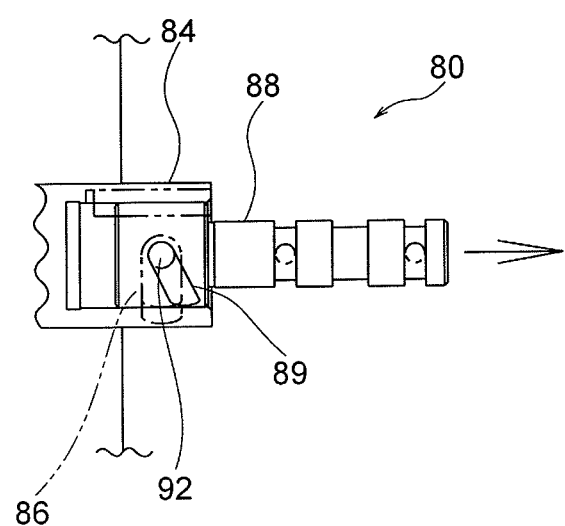
FIG. 7 is a diagram showing an operation of the switching part when the spool of the switching part is positioned at the forward position in the hydraulic actuator shown in FIG. 1.

Further, when the spool 88 moves in the right direction in FIGS. 1 and 7 along the axis direction, the positions of the respective grooves 88a, 88b, 88c provided on the outer circumferential surface of the spool 88 change, and the groove of the peripheral wall of the hole 40 that has been blocked by the spool 88 is opened. As a result, the second oil passage 32 and the fourth oil passage 52 as the return pipe communicate with each other (see FIG. 5). As a result, the return oil sent from the second oil chamber 71b in the tip tool 70 to the fourth oil passage 52 via the feed pipe 44 is returned from the second oil passage 32 to the oil chamber 28 of the hydraulic pump 20.

Figure 8:
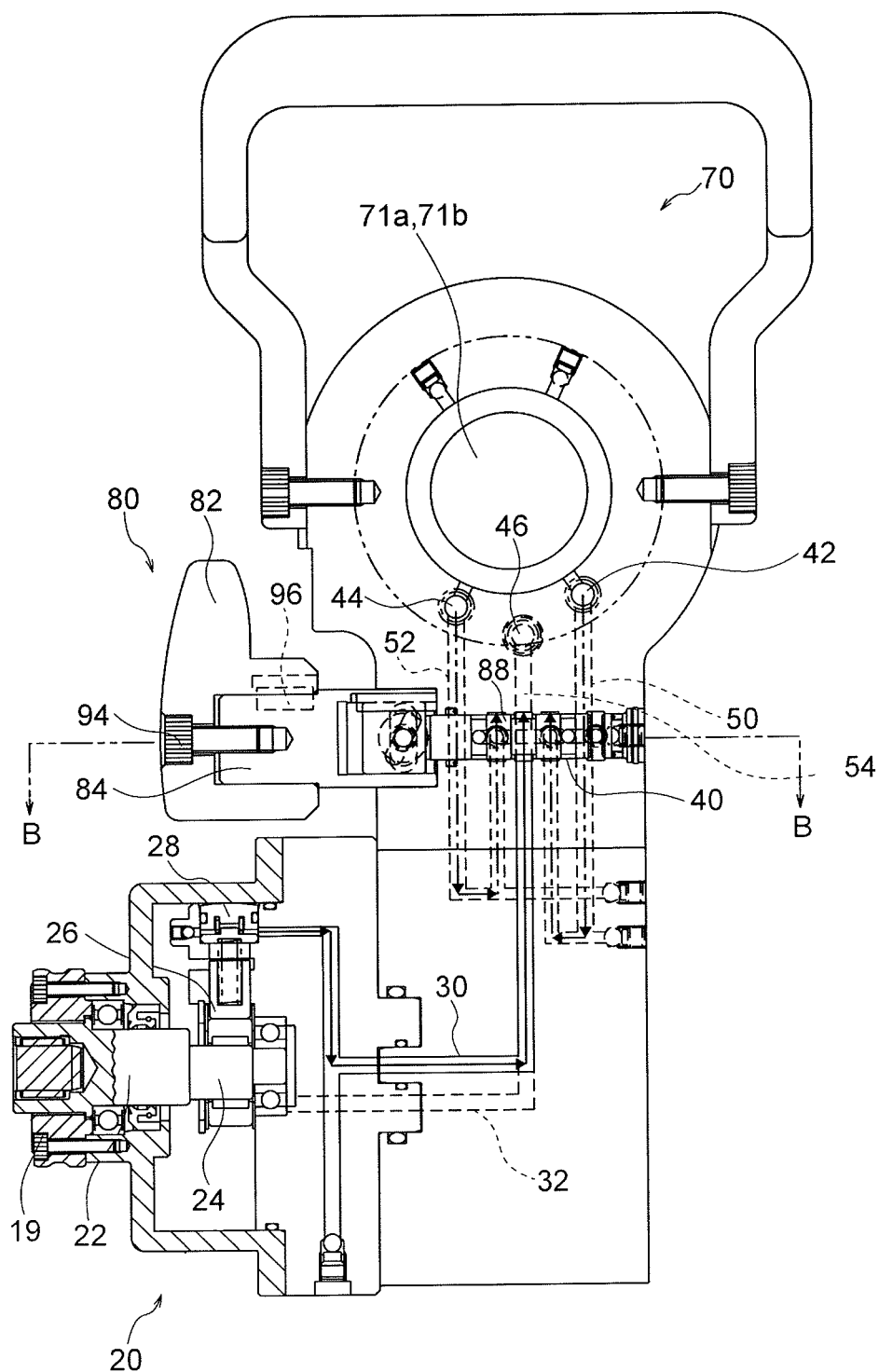
FIG. 8 is a diagram showing the internal configuration when the spool of the switching part is located in a neutral position in the hydraulic actuator shown in FIG. 1.
Figure 9:
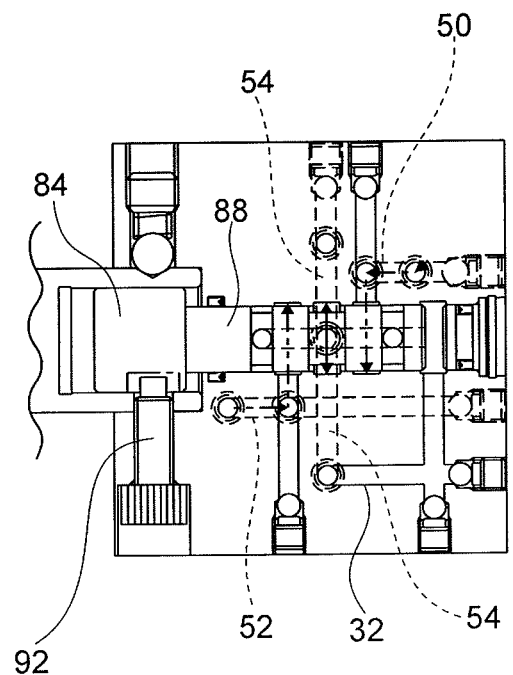
FIG. 9 is a view showing the internal configuration of the hydraulic actuator shown in FIG. 8 taken along the arrow line B-B.
Figure 10:
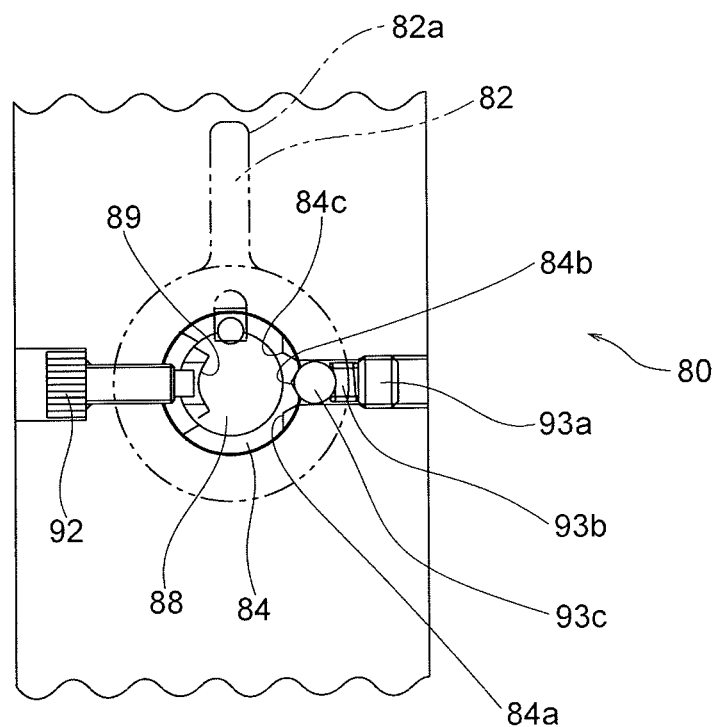
FIG. 10 is a view showing the state of the switching part when the spool of the switching part is located in the neutral position in the hydraulic actuator shown in FIG. 1.
Figure 11:
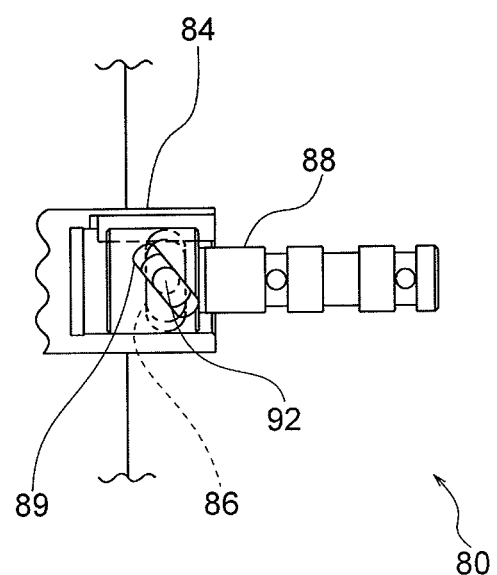
FIG. 11 is a diagram showing the operation of the switching part when the spool of the switching part is located at the neutral position in the hydraulic actuator shown in FIG. 1.

Next, an operation of stopping the piston member 74 and the head 78 in the tip tool 70 will be described with reference to FIGS. 8 to 11. When stopping the piston member 74 and the head 78 in the tip tool 70, the operator turns the operation knob 82 so that the operation knob 82 moves to the neutral position. Specifically, the operator turns the operation knob 82 so that the projecting portion 82a of the operation knob 82 is oriented upward as shown in FIG. 2. Here, as shown in FIG. 10, when the operation knob 82 is turned to the neutral position, the operation knob mounting part 84 also rotates integrally. Then, among the three grooves 84a, 84b, 84c provided on the outer peripheral surface of the operation knob mounting part 84, the steel ball 93c enters the groove 84b, whereby the operation knob mounting part 84 is positioned at the neutral position.

Also, when the operation knob mounting part 84 is positioned at the neutral position, the tip portion of the bolt 92 is located at the center position of the lead groove 89. At this time, as shown in FIGS. 8 and 9, some of the grooves extending along the circumferential direction of the hole 40 are blocked by the outer wall portions 88f, 88g of the spool 88. As shown in FIG. 8, the groove blocked by the outer wall portions 88f, 88g of the spool 88 communicates with the third oil passage 50 and the fourth oil passage 52, respectively. Therefore, as the groove communicating with the third oil passage 50 and the fourth oil passage 52 is blocked by the outer wall portions 88f, 88g of the spool 88, the third oil passage 50 and the fourth oil passage 52 do not communicate with the first oil passage 30 and the second oil passage 32, respectively. As a result, the pressurized oil is not sent from the third oil passage 50 and the fourth oil passage 52 to the first oil chamber 71a and the second oil chamber 71b of the tip tool 70 via the feed pipes 42 and 44. Therefore, the piston member 74 and the head 78 cannot be moved.

Figure 14:
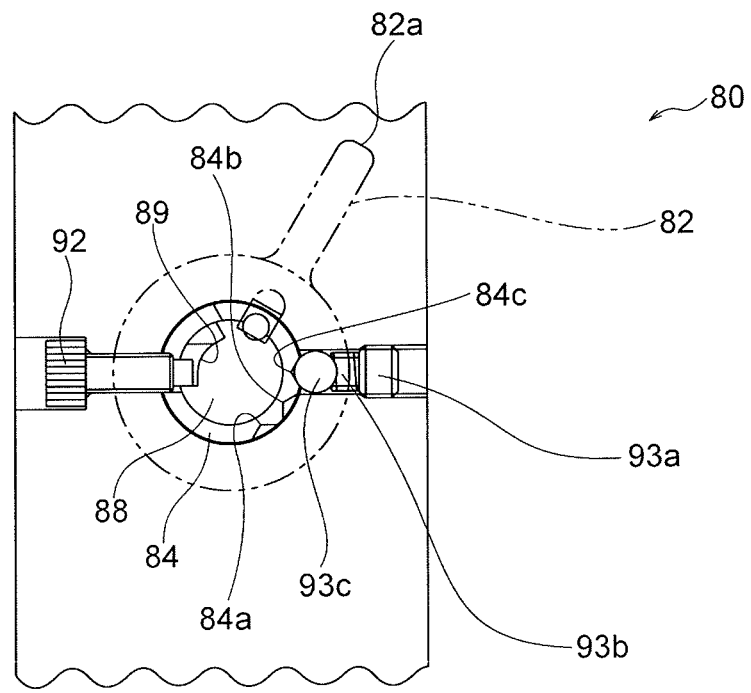
FIG. 14 is a view showing the state of the switching part when the spool of the switching part is positioned at the backward position in the hydraulic actuator shown in FIG. 1.
Figure 15:
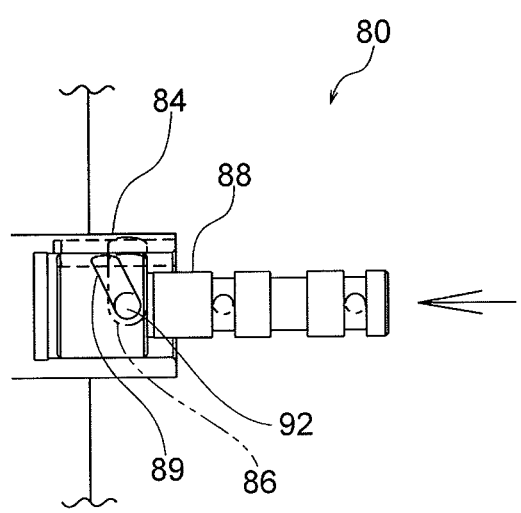
FIG. 15 is a diagram showing the operation of the switching part when the spool of the switching part is positioned at the backward position in the hydraulic actuator shown in FIG. 1.

Next, with reference to FIGS. 12 to 15, description will be given of an operation when the piston member 74 and the head 78 are retreated and the head 78 is returned to the original position (that is, the position closest to the head 76) in the tip tool 70. When returning the tip tool 70 to the initial state, the operator turns the operation knob 82 so that the operation knob 82 moves from the neutral position to the backward position. Specifically, when the operator turns the operation knob 82 in the clockwise direction in FIG. 2 so that the operator knocks down the projecting portion 82a to the right in FIG. 2, the operation knob 82 is positioned at the backward position. As shown in FIG. 14, when the operation knob 82 is turned to the backward position, the operation knob mounting part 84 also rotates integrally. Then, the steel ball 93c enters the groove 84c among the three grooves 84a, 84b and 84c provided on the outer peripheral surface of the operation knob mounting part 84, whereby the operation knob mounting part 84 is positioned at the backward position.

In addition, the tip portion of the bolt 92 provided at the fixed position in the hydraulic actuator 10 is inserted into the lead groove 89 which is inclined with respect to the axis direction of the spool 88. Therefore, when the operation knob mounting part 84 rotates in the clockwise direction in FIGS. 2 and 14, the tip portion of the bolt 92 relatively moves inside the lead groove 89. As a result, the spool 88 moves in the left direction in FIGS. 1, 12 and 15 along the axis direction. As described above, when the spool 88 moves in the left direction in FIGS. 1, 12 and 15 along the axis direction, the positions of the respective grooves 88a, 88b, 88c provided on the outer peripheral surface of the spool 88 change and the groove of the peripheral wall of the hole 40 that has been blocked by the spool 88 is opened. Therefore, the first oil passage 30 and the fourth oil passage 52 as the feed pipe communicate with each other (see FIG. 12). As a result, when the hydraulic pump 20 is operated and the pressurized oil is sent from the oil chamber 28 of this hydraulic pump 20 to the first oil passage 30, the pressurized oil is sent from the fourth oil passage 52 to the second oil chamber 71b of the tip tool 70 via the feed pipe 44. When the pressurized oil is sent from the fourth oil passage 52 to the second oil chamber 71b via the feed pipe 44, the piston member 74 moves to the right side in FIG. 2 and the head 78 moves in the right direction in FIG. 2. As a result, the head 78 is returned to the initial position. In this way, the tip tool 70 can be returned to the initial state.

Figure 12:
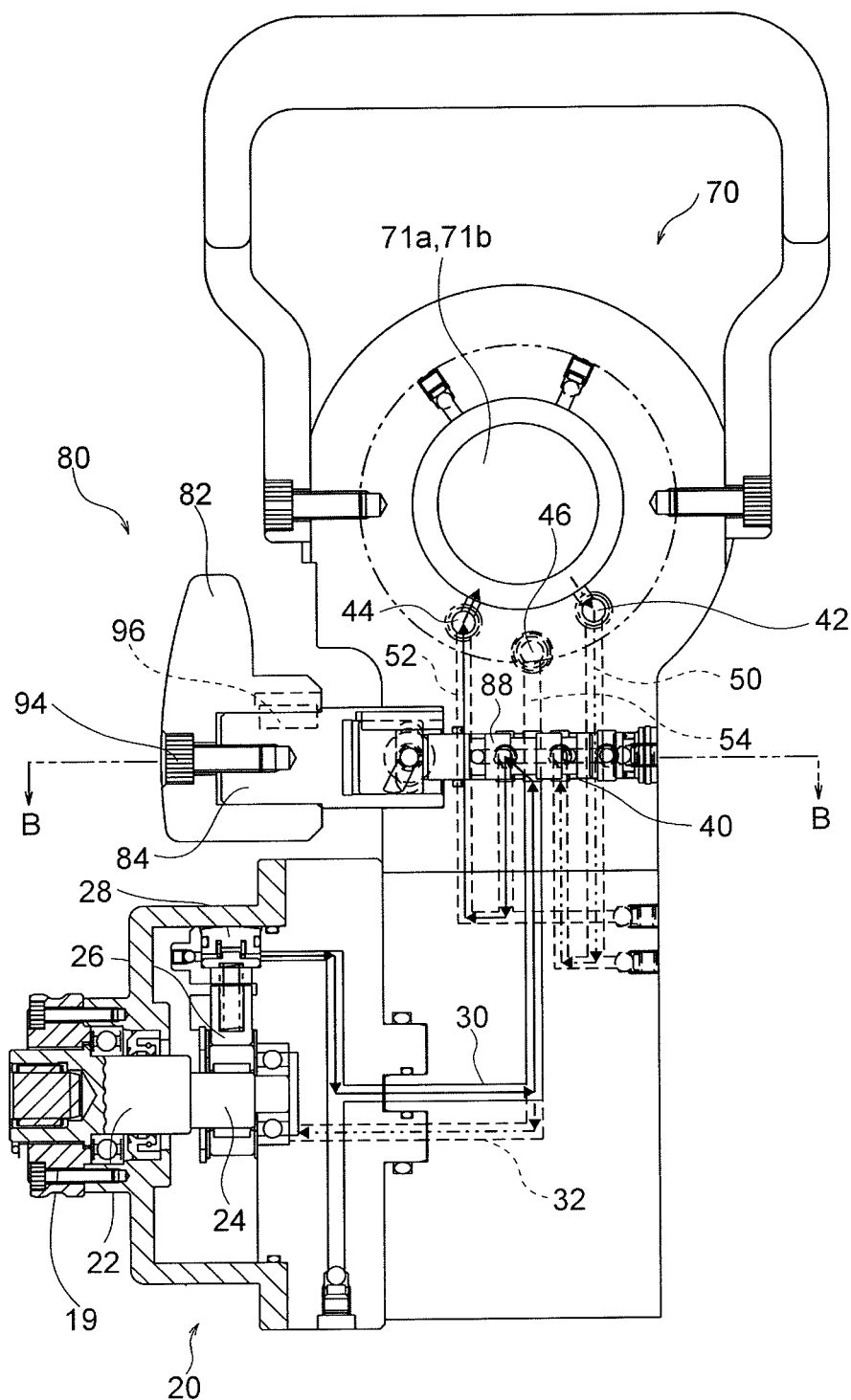
FIG. 12 is a diagram showing the internal configuration when the spool of the switching part is positioned at a backward position in the hydraulic actuator shown in FIG. 1.
Figure 13:
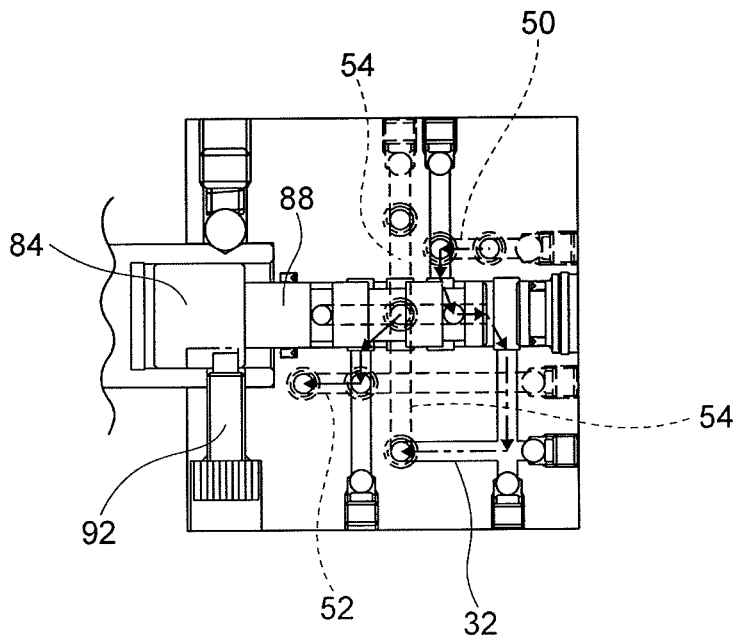
FIG. 13 is a diagram showing the internal configuration of the hydraulic actuator shown in FIG. 12 taken along the arrow line B-B.

Further, when the spool 88 moves in the left direction in FIGS. 1 and 12 along the axis direction, the positions of the respective grooves 88a, 88b, 88c provided on the outer circumferential surface of the spool 88 change, and the groove of the peripheral wall of the hole 40 that has been blocked by the spool 88 is opened. As a result, the second oil passage 32 and the third oil passage 50 as the return pipe communicate with each other (see FIG. 13). Therefore, the return oil sent from the first oil chamber 71a of the tip tool 70 to the third oil passage 50 via the feed pipe 42 is returned from the second oil passage 32 to the oil chamber 28 of the hydraulic pump 20.

According to the hydraulic actuator 10 of the present embodiment having the above configuration, the switching part 80 for switching at least one route of the pressurized oil and the return oil is provided in the oil passage for sending the pressurized oil generated by the hydraulic pump 20 to the tip tool 70 and returning the return oil from the tip tool 70 to the hydraulic pump 20. The switching part 80 includes the operation knob 82 (operating portion) and the spool 88 (axis portion) which moves forward and backward when the operation knob 82 is turned. When the operation knob 82 is turned, the spool 88 moves forward and backward in the direction orthogonal to the direction in which the operation knob 82 is turned, whereby the route in the oil passage is switched. As a result, only by the operator turning the operation knob 82, the spool 88 advances and retreats in the direction orthogonal to the direction in which the operation knob 82 is turned, and at least one route of the pressurized oil and the return oil in the oil passage is switched. For this reason, the mechanism for switching the routes of the pressurized oil and the return oil in the oil passage is not complicated, so the hydraulic actuator 10 can be made compact and inexpensive with a simple configuration.

In addition, in the hydraulic actuator 10 of the present embodiment, as described above, the switching part 80 is provided with the operation knob mounting part 84 as a converting member for converting the rotational movement of the operation knob 82 into the advancing and retreating movement of the spool 88. In addition, the operation knob 82, the operation knob mounting part 84 and the spool 88 rotate in the same phase. The lead groove 89 is provided on the outer peripheral surface of the spool 88, and the lead groove 89 extends in the direction inclined with respect to the circumferential direction and the advancing and retreating direction of the spool 88. In addition, the bolt 92, as a fixing member provided in the fixed position, is inserted into the lead groove 89. This makes it possible to simplify the configuration of advancing and retreating the spool 88 in the direction orthogonal to the direction of rotating the operation knob 82 when the operation knob 82 is turned.

In the hydraulic actuator 10 of the present embodiment, as described above, the spool 88 of the switching part 80 is provided with the grooves 88a, 88b, 88c (first grooves) extending along the circumferential direction of the spool 88. When the operation knob 82 is turned to move the spool 88 forward and backward, the positions of the grooves 88a, 88b, 88c are changed so that the route in the oil passage is switched. In this case, as the route in the oil passage is switched by sliding the positions of the grooves 88a, 88b, 88c along the axis direction of the spool 88, switching of the route in the oil passage can be performed without applying large pressure of pressurized oil and the like to spool 88 of the switching part 80.

In addition, in the hydraulic actuator 10 of the present embodiment, as described above, the hole 40 into which the spool 88 of the switching part 80 is inserted is formed in a main body portion of the hydraulic actuator 10. On the peripheral wall of the hole 40, the groove extending along the circumferential direction of the hole 40 (second groove) is provided. When the operation knob 82 is turned to move the spool 88 forward and backward, the groove blocked by the spool 88 is opened or the groove is closed by the spool 88. In this way, the route in the oil passage is switched. In this case, by simply sliding the spool 88 in the axis direction, it is possible to open and close the groove formed on the peripheral wall of the hole 40. For this reason, it is possible to switch the route in the oil passage without applying the large pressure of the pressurized oil and the like to the spool 88 of the switching part 80.

The hydraulic actuator according to the present embodiment is not limited to the above-described mode, and various modifications can be made.

For example, in the hydraulic actuator 10 described above, the switching part 80 switches both routes of the pressurized oil and the return oil in the oil passage. However, the present embodiment is not limited to such an embodiment. In another embodiment, the switching part 80 may switch only one route of the pressurized oil and the return oil in the oil passage.

In the above described hydraulic actuator 10, when the spool 88 of the switching part 80 moves in the lateral direction in FIG. 1 and the like along the axis direction, the positions of the grooves 88a, 88b, 88c provided on the outer peripheral surface of the spool 88 are changed, and the groove of the peripheral wall of the hole 40 that has been blocked by the spool 88 is opened or the groove of the peripheral wall of the hole 40 is blocked by the spool 88. This switches the route of the pressurized oil and the return oil in the oil passage. However, the present embodiment is not limited to such an embodiment. As another embodiment, the grooves 88a, 88b, 88c may not be provided on the outer peripheral surface of the spool 88. Even in such a case, when the spool 88 of the switching part 80 moves in the lateral direction in FIG. 1 and the like along the axis direction, the groove of the peripheral wall of the hole 40 that has been blocked by the spool 88 is opened or the groove of the peripheral wall of the hole 40 is blocked by the spool 88, and therefore the route of the pressurized oil and the return oil in the oil passage is switched. Further, as still another embodiment, no groove is provided on the peripheral wall of the hole 40, and when the spool 88 of the switching part 80 moves in the lateral direction in FIG. 1 and the like along the axis direction, the positions of the respective grooves 88a, 88b, 88c provided on the outer circumferential surface of the spool 88 may be changed so that the route of the pressurized oil and the return oil in the oil passage is switched.

In the hydraulic actuator 10 shown in FIGS. 1 to 15, the tip tool 70 including a pair of heads 76 and 78 for widening the gap of the object is used as the tip tool. However, other types of tip tools may be attached to the main body portion of the hydraulic actuator.

Figure 16:
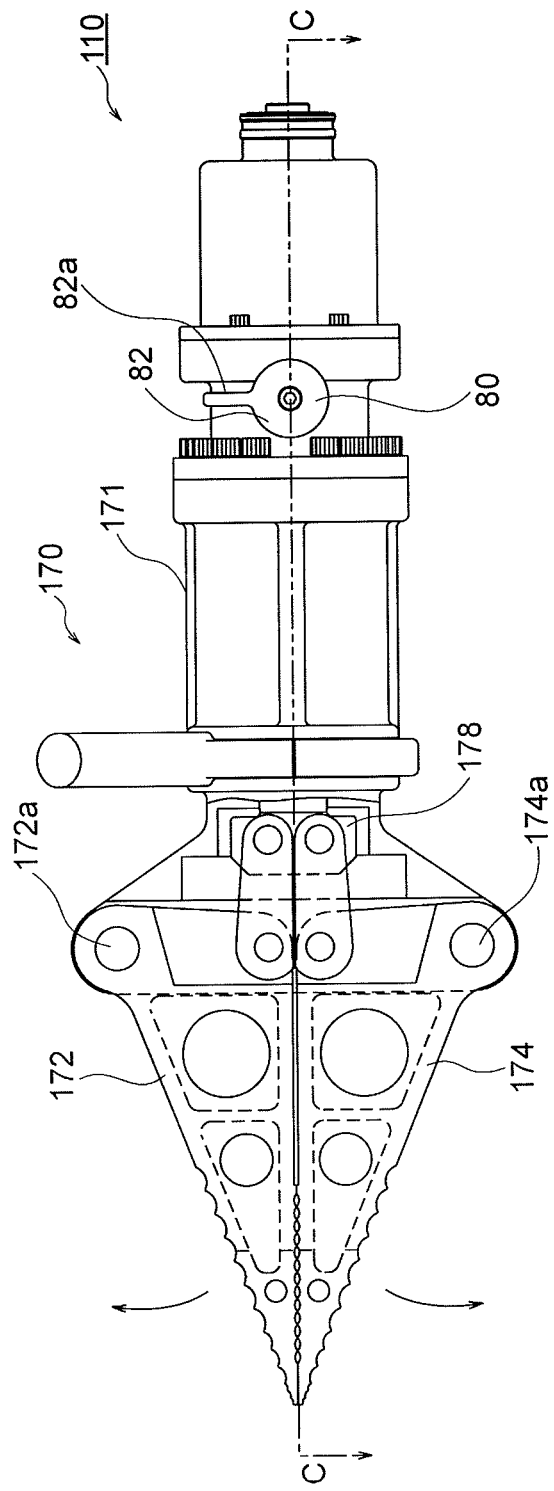
FIG. 16 is a front view showing another configuration of the hydraulic actuator according to the embodiment of the present invention.
Figure 17:
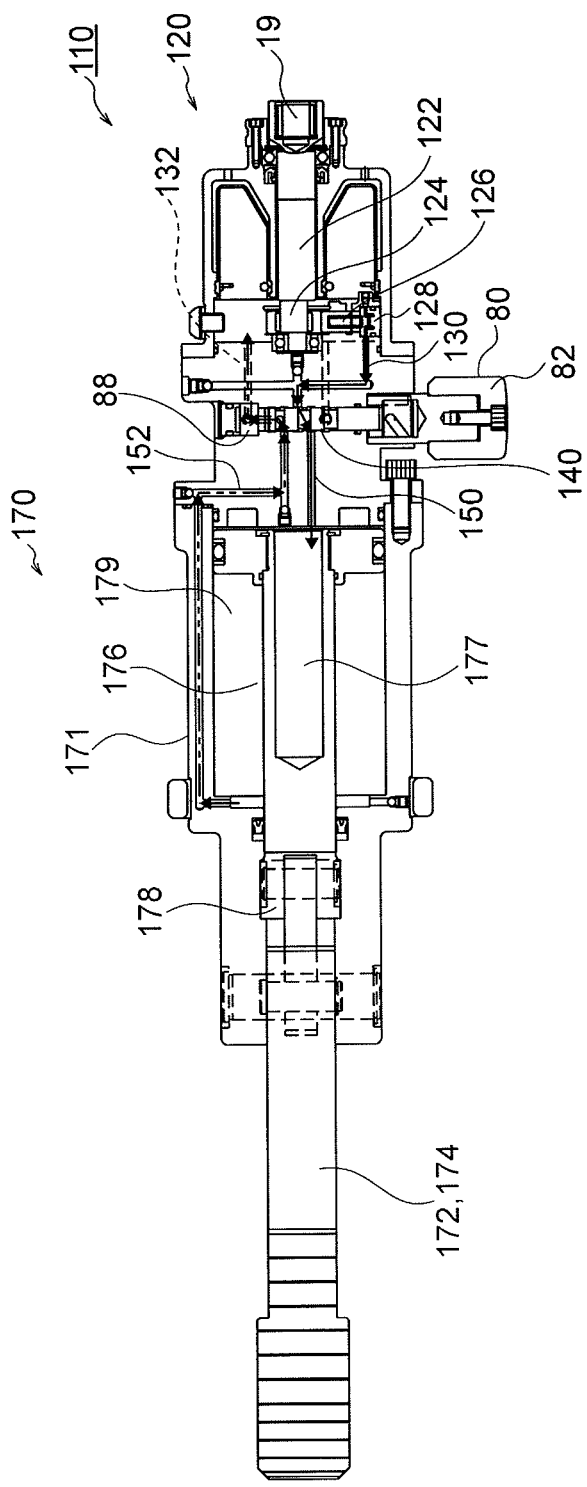
FIG. 17 is a side view of the hydraulic actuator shown in FIG. 16 taken along an arrow line C-C, showing an internal configuration when a spool of a switching part is positioned at a forward position.
Figure 18:
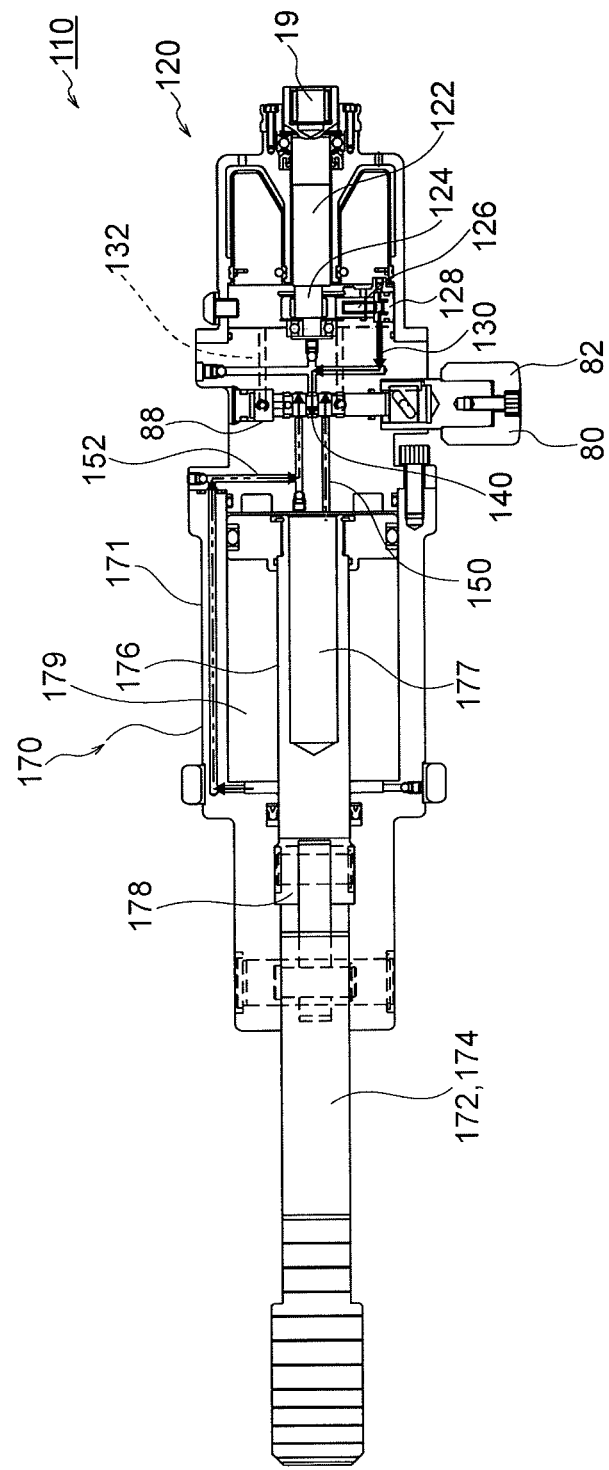
FIG. 18 is a side view of the hydraulic actuator shown in FIG. 16 taken along the arrow line C-C, showing the internal configuration when the spool of the switching part is positioned at a neutral position.
Figure 19:
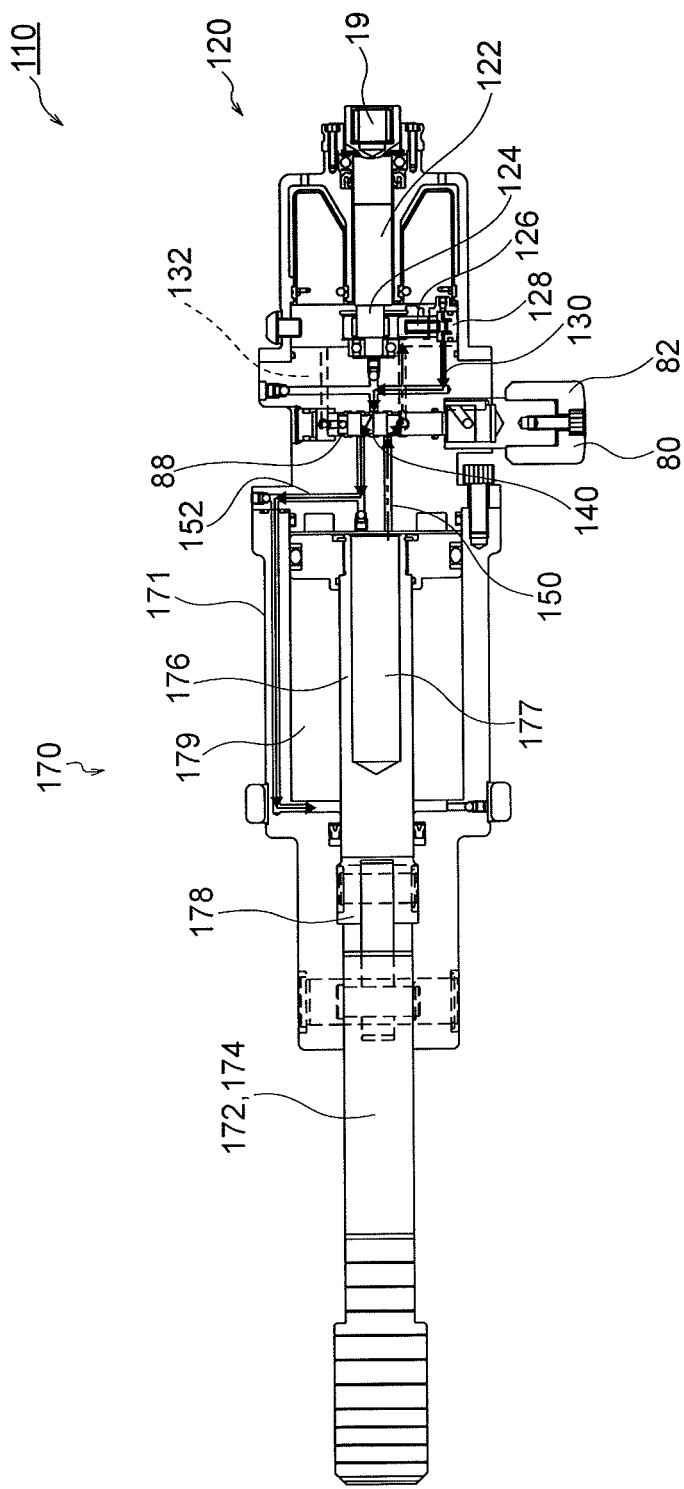
FIG. 19 is a side view of the hydraulic actuator shown in FIG. 16 taken along the arrow line C-C, showing the internal configuration when the spool of the switching part is positioned at a backward position.

For example, as shown in FIGS. 16 to 19, a hydraulic actuator 110 may be used in which a tip tool 170 including a pair of opening members 172, 174 for widening a gap of an object is attached to a main body portion. FIG. 16 is a front view showing the hydraulic actuator 110 having another configuration according to the present embodiment. FIGS. 17 to 19 are side views of the hydraulic actuator 110 shown in FIG. 16 taken along the arrow line C-C, respectively, showing an internal configuration when the spool 88 of the switching part 80 is positioned at the forward position, the neutral position, and the backward position.

In the hydraulic actuator 110 shown in FIGS. 16 to 19, as a switching part for switching a route in an oil passage for sending pressurized oil generated by a hydraulic pump 120 to the tip tool 170 and returning return oil from the tip tool 170 to the hydraulic pump 120, a switching part having substantially the same configuration as the switching part 80 of the hydraulic actuator 10 shown in FIGS. 1 to 15 is used. Therefore, in explaining the hydraulic actuator 110 shown in FIGS. 16 to 19, the switching part for switching the route in the oil passage for sending the pressurized oil generated by the hydraulic pump 120 to the tip tool 170 and returning the return oil from the tip tool 170 to the hydraulic pump 120 is indicated by the reference numeral 80, and explanation of this switching part is omitted.

As shown in FIGS. 17 to 19, the hydraulic actuator 110 is provided with the hydraulic pump 120 for generating the pressurized oil for operating the tip tool 170. The hydraulic pump 120 includes an oil chamber 128, a cylindrical rotating member 122, an eccentric member 124 attached to a tip of the rotating member 122, and a piston 126 that moves up and down as the eccentric member 124 rotates. The insertion part 19 provided at the tip of the rotation axis 18, attached to the motor 16 in the hydraulic actuator 10 shown in FIGS. 1 to 15, is inserted into the rotating member 122. That is, instead of inserting the insertion part 19 into the rotating member 22 in the hydraulic actuator 10 shown in FIGS. 1 to 15, by inserting the insertion part 19 into the rotating member 122 shown in FIGS. 17 to 19, the tip tool can be exchanged from the tip tool 70 shown in FIGS. 1 to 15 to the tip tool 170 shown in FIGS. 16 to 19. The eccentric member 124 is eccentric with respect to an axis line of the rotating member 122, and a bearing such as a needle roller bearing is attached to an outer peripheral surface of the eccentric member 124. The piston 126 is constantly pressed against an outer peripheral surface of the bearing by a spring (not shown). Therefore, when the rotating member 122 rotates, the eccentric member 124 and the bearing eccentrically rotate with respect to the axis line of the rotating member 122, whereby the piston 126 moves up and down. As a result, the pressurized oil is sent from the oil chamber 128 toward the tip tool 170, and the tip tool 170 is operated.

As shown in FIGS. 17 to 19, a plurality of oil passages 130, 132, 150 and 152 for sending the pressurized oil from the oil chamber 128 of the hydraulic pump 120 to the tip tool 170 or returning the return oil from the tip tool 170 to the oil chamber 128 are provided inside the hydraulic actuator 110. Of the plurality of oil passages 130, 132, 150 and 152, a first oil passage 130 is a feed pipe through which the pressurized oil is sent from the oil chamber 128 of the hydraulic pump 120 to the tip tool 170, and a second oil passage 132 is a return pipe through which the return oil returned from the tip tool 170 to the oil chamber 128 passes. The first oil passage 130 and the second oil passage 132 communicate with a hole 140 into which the spool 88 of the switching part 80 is inserted, respectively. Of the plurality of oil passages 130, 132, 150 and 152, a third oil passage 150 is a feed pipe that sends the pressurized oil to an oil chamber 177 provided inside a piston member 176 of the tip tool 170 described later, and a fourth oil passage 152 is a feed pipe that sends the pressurized oil to an oil chamber 179 provided outside the piston member 176. The third oil passage 150 and the fourth oil passage 152 also communicate with the hole 140 into which the spool 88 of the switching part 80 is inserted. Then, by the switching part 80, the oil passage communicated with each of the first oil passage 130 and the second oil passage 132 is switched to either the third oil passage 150 or the fourth oil passage 152.

Next, the configuration of the tip tool 170 will be described in detail with reference to FIGS. 16 to 19. The tip tool 170 includes the pair of opening members 172 and 174 that are rotatable about axes 172a and 174a respectively, a base member 178, a cylinder 171 having a cylindrical shape, and the piston member 176 provided inside the cylinder 171 and to its tip the base member 178 is attached. When the pressurized oil is sent from the hydraulic pump 120 to the tip tool 170, the piston member 176 is pushed to a left side in FIG. 16. Then, when the piston member 176 is pushed out to the left side in FIG. 16, the base member 178 also moves in a left direction in FIG. 16, so that each opening member 172, 174 rotates about the axes 172a, 174a in a direction of an arrow shown in FIG. 16. As a result, the tip portions of the pair of opening members 172, 174 are opened. In this way, after inserting the tip portion of each opening member 172, 174 into the gap of the object to be broken open by the tip tool 170, the pressurized oil is sent from the hydraulic pump 120 to the tip tool 170. Thus, by opening the tip portions of the pair of opening members 172, 174, the gap of the object can be expanded.

More specifically, in the tip tool 170, the oil chamber 177 is formed inside the piston member 176. When the pressurized oil is sent from the third oil passage 150 to the oil chamber 177, the piston member 176 moves to the left side in FIGS. 16 to 19. The oil chamber 179 is also provided outside the piston member 176. When the pressurized oil is sent from the fourth oil passage 152 to the oil chamber 179, the piston member 176 moves to a right side in FIGS. 16 to 19.

As shown in FIGS. 17 to 19, the hole 140 into which the spool 88 of the switching part 80 is inserted is provided in the hydraulic actuator 110, and the oil passages 130, 132, 150 and 152 described above are respectively communicated with the hole 140. A plurality of grooves (second grooves) extending along a circumferential direction of the hole 140 are also formed on a peripheral wall of the hole 140. When the operation knob mounting part 84 is located at the neutral position, several grooves are blocked by the outer wall portions 88f, 88g of the spool 88. On the other hand, when the operation knob mounting part 84 is positioned at the forward position or the backward position, all the grooves are opened without being blocked by the respective outer wall portions 88f, 88g of the spool 88. In addition, in the present embodiment, the position of the spool 88 in the vertical direction in FIGS. 17 to 19 changes depending on the positions of the operation knob 82 and the operation knob mounting part 84. Therefore, the oil passage communicating with each of the first oil passage 130 and the second oil passage 132 is switched to either the third oil passage 150 or the fourth oil passage 152.

Next, the operation of the hydraulic actuator 110 having such a configuration will be described below.

First, with reference to FIG. 17, description will be given of an operation when the gap of the object is broken open by the tip tool 170. When opening the gap of the object with the tip tool 170, the operator turns the operation knob 82 so that the operation knob 82 moves from the neutral position to the forward position. Specifically, when the hydraulic actuator 110 is on standby, the operation knob 82 is located at the neutral position, and the projecting portion 82a of the operation knob 82 is oriented upward as shown in FIG. 16. From this state, when the operator turns the operation knob 82 in the counterclockwise direction in FIG. 16 so that the operator knocks down the projecting portion 82a to the left in FIG. 16, the operation knob 82 is positioned at the forward position. Also, when the operation knob 82 is turned to the forward position, the operation knob mounting part 84 also rotates integrally, so that the tip portion of the bolt 92 relatively moves inside the lead groove 89. As a result, the spool 88 moves in an upward direction in FIG. 17 along the axis direction. In this way, when the spool 88 moves upward in FIG. 17 along the axis direction, the positions of the respective grooves 88a, 88b, 88c provided on the outer circumferential surface of the spool 88 change, and the groove of the peripheral wall of the hole 140 that has been blocked by the spool 88 is opened. As a result, the first oil passage 130 and the third oil passage 150 as a feed pipe communicate with each other (see FIG. 17). Therefore, when the hydraulic pump 120 is operated and the pressurized oil is sent from the oil chamber 128 of the hydraulic pump 120 to the first oil passage 130, the pressurized oil is sent from the third oil passage 150 to the oil chamber 177 of the tip tool 170. When the pressurized oil is sent from the third oil passage 150 to the oil chamber 177 in this manner, the piston member 176 moves to the left side in FIG. 17 and the base member 178 advances in the left direction in FIG. 17. As a result, each opening member 172, 174 opens in the direction of the arrow in FIG. 16 around the axes 172a, 174a. In this manner, by opening the tip portions of the opening members 172, 174 caught in the gap of the object to be broken open by the tip tool 170, the gap of the object can be expanded.

Also, when the spool 88 moves in the upward direction in FIG. 17 along the axis direction, the positions of the grooves 88a, 88b, 88c provided on the outer peripheral surface of the spool 88 are changed, and the groove of the peripheral wall of the hole 140 that has been blocked by the spool 88 is opened. As a result, the second oil passage 132 and the fourth oil passage 152 serving as the return pipe communicate with each other (see FIG. 17). Therefore, the return oil sent from the oil chamber 179 provided outside the piston member 176 in the tip tool 170 to the fourth oil passage 152 is returned from the second oil passage 132 to the oil chamber 128 of the hydraulic pump 120.

Next, an operation of stopping the piston member 176 and the base member 178 in the tip tool 170 will be described with reference to FIG. 18. When stopping the piston member 176 and the base member 178 in the tip tool 170, the operator turns the operation knob 82 so that the operation knob 82 moves to the neutral position. Specifically, the operator turns the operation knob 82 so that the projecting portion 82a of the operation knob 82 is oriented upward as shown in FIG. 16. When the operation knob 82 is turned to the neutral position, the operation knob mounting part 84 also rotates together, and the spool 88 is also positioned at the center position. At this time, as shown in FIG. 18, some of the plurality of grooves extending along the circumferential direction of the peripheral wall of the hole 140 are blocked by the outer wall portions 88f, 88g of the spool 88. The groove blocked by the outer wall portions 88f, 88g of the spool 88 communicates with the third oil passage 150 and the fourth oil passage 152, respectively. Therefore, as the groove communicating with the third oil passage 150 and the fourth oil passage 152 is blocked by the outer wall portions 88f, 88g of the spool 88, the third oil passage 150 and the fourth oil passage 152 do not communicate with the first oil passage 130 and the second oil passage 132, respectively. As a result, the pressurized oil is not sent from the third oil passage 150 and the fourth oil passage 152 to the oil chambers 177, 179 of the tip tool 170, so that the piston member 176 and the base member 178 cannot be moved.

Next, with reference to FIG. 19, description will be given on an operation when retreating the piston member 176 and the base member 178 in the tip tool 170 to return each opening member 172, 174 to the original position (that is, the position shown in FIG. 16). When returning the tip tool 170 to the initial state, the operator turns the operation knob 82 so that the operation knob 82 moves from the neutral position to the backward position. Specifically, when the operator turns the operation knob 82 in the clockwise direction in FIG. 16 so that the operator knocks down the projecting portion 82a to the right in FIG. 16, the operation knob 82 is positioned at the backward position. When the operation knob 82 is turned to the backward position, the operation knob mounting part 84 also rotates integrally, and the tip portion of the bolt 92 relatively moves inside the lead groove 89. As a result, the spool 88 moves in a downward direction in FIG. 19 along the axis direction. In this way, when the spool 88 moves in the downward direction in FIG. 19 along the axis direction, the positions of the respective grooves 88a, 88b, 88c provided on the outer circumferential surface of the spool 88 are changed, and the groove of the peripheral wall of the hole 140 that has been blocked by the spool 88 is opened. As a result, the first oil passage 130 and the fourth oil passage 152 serving as the feed pipe communicate with each other (see FIG. 19). Therefore, when the hydraulic pump 120 is operated and the pressurized oil is sent from the oil chamber 128 of the hydraulic pump 120 to the first oil passage 130, the pressurized oil is sent from the fourth oil passage 152 to the oil chamber 179 of the tip tool 170. When the pressurized oil is sent from the fourth oil passage 152 to the oil chamber 179, the piston member 176 moves to the right side in FIG. 19 and the base member 178 moves to the right direction in FIG. 19. As a result, each opening member 172, 174 is rotated in a direction approaching each other about the axes 172a, 174a. In this way, the tip tool 170 can be returned to the initial state.

Further, when the spool 88 moves in the downward direction in FIG. 19 along the axis direction, the positions of the respective grooves 88a, 88b, 88c provided on the outer circumferential surface of the spool 88 are changed, and the groove of the peripheral wall of the hole 140 that has been blocked by the spool 88 is opened. As a result, the second oil passage 132 and the third oil passage 150 as the return pipe communicate with each other (see FIG. 19). Therefore, the return oil sent from the oil chamber 177 of the tip tool 170 to the third oil passage 150 is returned from the second oil passage 132 to the oil chamber 128 of the hydraulic pump 120.

In the hydraulic actuator 110 as shown in FIGS. 16 to 19, only by the operator turning the operation knob 82, the spool 88 moves forward or backward in the direction orthogonal to the direction in which the operation knob 82 is turned. Therefore, it is possible to switch the route of at least one of the pressurized oil and the return oil in the oil passage. For this reason, the mechanism for switching the routes of the pressurized oil and the return oil in the oil passage is not complicated, so that the hydraulic actuator 110 can be made compact and inexpensive with a simple configuration.

Figure 20:
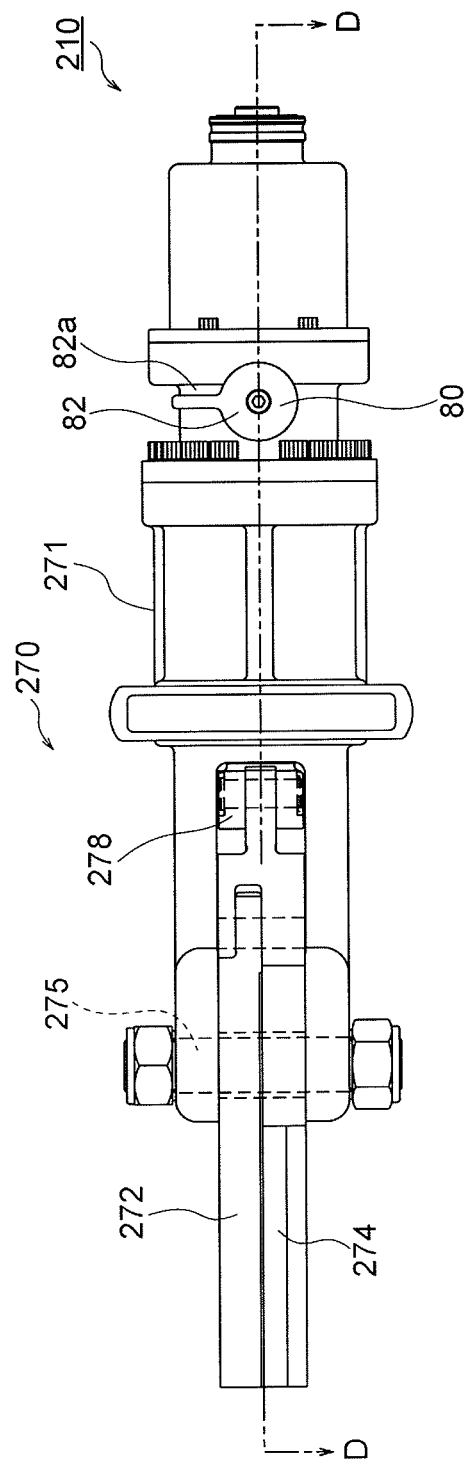
FIG. 20 is a front view showing still another configuration of the hydraulic actuator according to the embodiment of the present invention.
Figure 21:
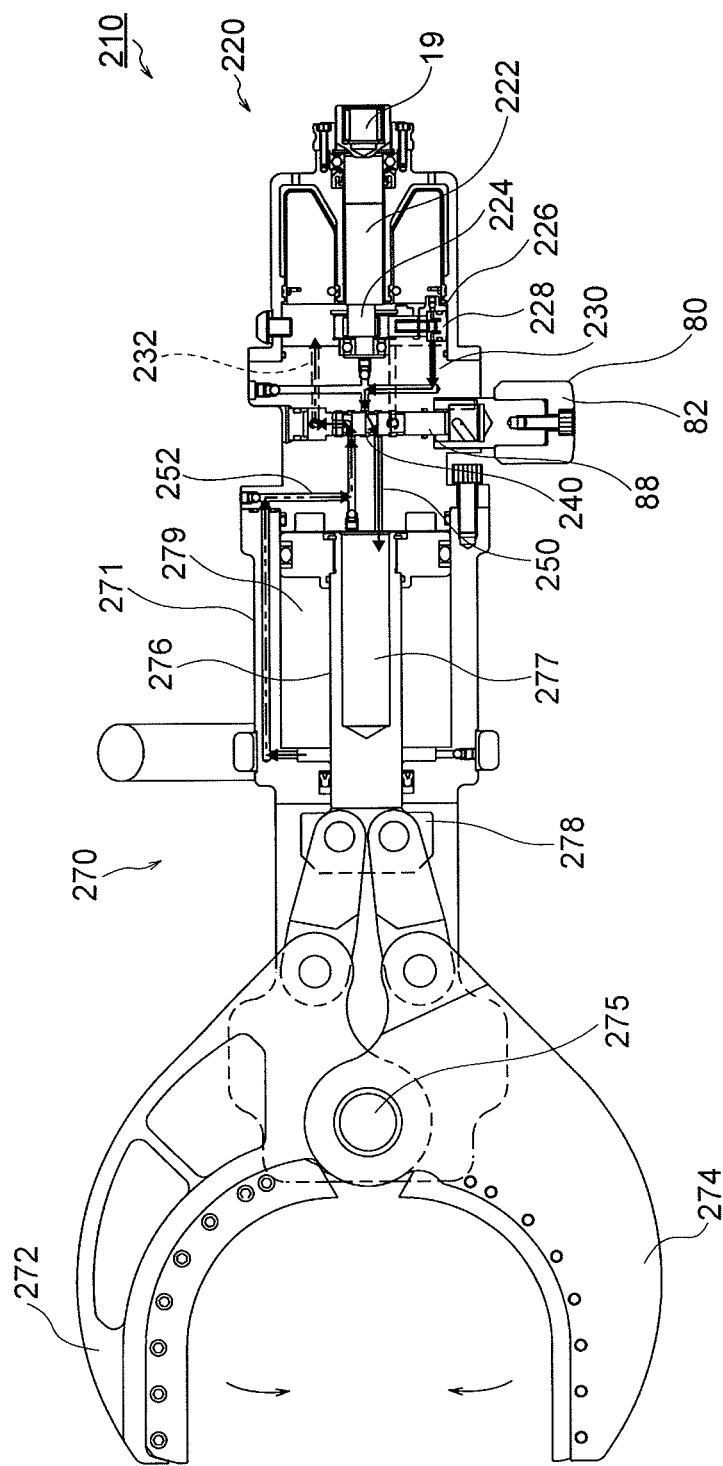
FIG. 21 is a side view of the hydraulic actuator shown in FIG. 20 taken along an arrow line D-D, showing an internal configuration when a spool of a switching part is positioned at a forward position.
Figure 22:
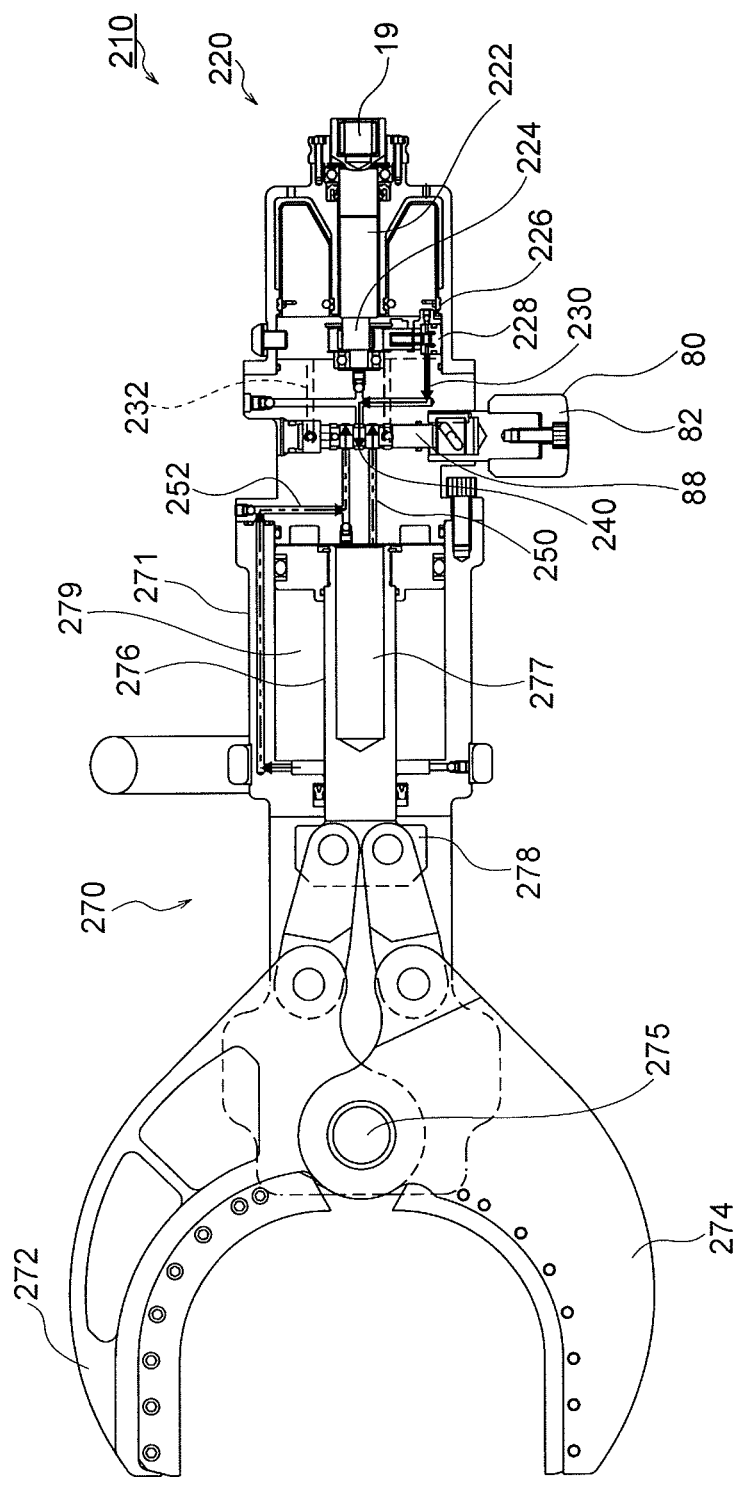
FIG. 22 is a side view of the hydraulic actuator shown in FIG. 20 taken along the arrow line D-D, showing the internal configuration when the spool of the switching part is positioned at a neutral position.
Figure 23:
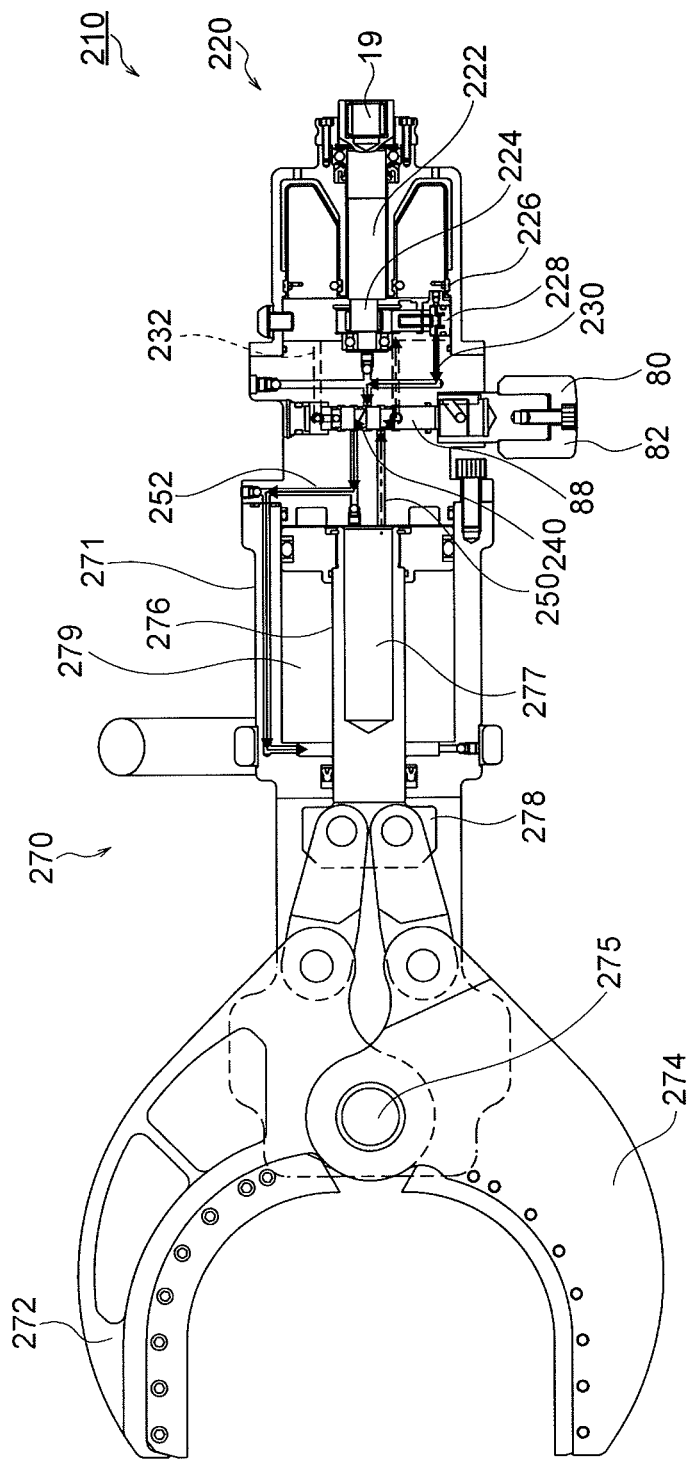
FIG. 23 is a side view of the hydraulic actuator shown in FIG. 20 taken along the arrow line D-D, showing the internal configuration when the spool of the switching part is positioned at a backward position.

Further, as the hydraulic actuator according to the present embodiment, a hydraulic actuator 210 in which a tip tool 270 including a pair of blades 272, 274 for cutting an object is attached to a main body portion as shown in FIGS. 20 to 23 may be used. FIG. 20 is a front view showing the hydraulic actuator 210 having still another configuration according to the present embodiment, and FIGS. 21 to 23 are side views of the hydraulic actuator 210 taken along an arrow line D-D in the hydraulic actuator 210 shown in FIG. 20, respectively. Specifically, FIGS. 21 to 23 are diagrams showing the internal configuration when the spool 88 of the switching part 80 is positioned at the forward position, the neutral position, and the backward position. In the hydraulic actuator 210 shown in FIGS. 20 to 23, as a switching part for switching a route in an oil passage for sending pressurized oil generated by a hydraulic pump 220 to the tip tool 270 and returning return oil from the tip tool 270 to the hydraulic pump 220, a switching part having substantially the same configuration as the switching part 80 of the hydraulic actuator 10 shown in FIGS. 1 to 15 is used. Therefore, in explaining the hydraulic actuator 210 shown in FIGS. 20 to 23, the switching part configured to switch the route in the oil passage for switching the pressurized oil generated by the hydraulic pump 220 to the tip tool 270 and returning the return oil from the tip tool 270 to the hydraulic pump 220 is indicated by reference numeral 80, and explanation of this switching part is omitted.

As shown in FIGS. 21 to 23, the hydraulic actuator 210 is provided with the hydraulic pump 220 for generating the pressurized oil for operating the tip tool 270. The hydraulic pump 220 includes an oil chamber 228, a cylindrical rotating member 222, an eccentric member 224 attached to the tip of the rotating member 222, and a piston 226 that moves up and down as the eccentric member 224 rotates. To the rotating member 222, the insertion part 19 provided at the tip of the rotation axis 18 attached to the motor 16 in the hydraulic actuator 10 shown in FIGS. 1 to 15 is inserted. That is, instead of inserting the insertion part 19 into the rotating member 22 in the hydraulic actuator 10 shown in FIGS. 1 to 15, by inserting the insertion part 19 into the rotating member 222 shown in FIGS. 21 to 23, the tip tool can be exchanged from the tip tool 70 shown in FIGS. 1 to 15 to the tip tool 270 shown in FIGS. 20 to 23. The eccentric member 224 is eccentric with respect to an axis line of the rotating member 222, and a bearing such as a needle roller bearing is attached to an outer peripheral surface of the eccentric member 224. The piston 226 is constantly pressed against an outer peripheral surface of the bearing by a spring (not shown). Therefore, when the rotating member 222 rotates, the eccentric member 224 and the bearing eccentrically rotate with respect to the axis line of the rotating member 222, whereby the piston 226 moves up and down. As a result, the pressurized oil is sent from the oil chamber 228 toward the tip tool 270, and the tip tool 270 is operated.

As shown in FIGS. 21 to 23, a plurality of oil passages 230, 232, 250 and 252 for sending the pressurized oil from the oil chamber 228 of the hydraulic pump 220 to the tip tool 270 or returning the return oil from the tip tool 270 to the oil chamber 228 are provided inside the hydraulic actuator 210. Of the plurality of oil passages 230, 232, 250 and 252, a first oil passage 230 is a feed pipe through which the pressurized oil is sent from the oil chamber 228 of the hydraulic pump 220 to the tip tool 270, and a second oil passage 232 is a return pipe through which the return oil returned from the tip tool 270 to the oil chamber 228 passes. The first oil passage 230 and the second oil passage 232 communicate with a hole 240 into which the spool 88 of the switching part 80 is inserted, respectively. Of the plurality of oil passages 230, 232, 250 and 252, a third oil passage 250 is a feed pipe that sends the pressurized oil to an oil chamber 277 provided inside a piston member 276 of the tip tool 270 described later, and a fourth oil passage 252 is a feed pipe that sends the pressurized oil to an oil chamber 279 provided outside the piston member 276. The third oil passage 250 and the fourth oil passage 252 also communicate with the hole 240 into which the spool 88 of the switching part 80 is inserted. Then, by the switching part 80, the oil passage communicated with each of the first oil passage 230 and the second oil passage 232 is switched to either the third oil passage 250 or the fourth oil passage 252.

Next, the configuration of the tip tool 270 will be described in detail with reference to FIGS. 20 to 23. The tip tool 270 includes the pair of blades 272 and 274 rotatable about an axis 275, a base member 278, a cylindrical cylinder 271, and the piston member 276 provided inside the cylinder 271 and to its tip the base member 278 is attached. When the pressurized oil is sent from the hydraulic pump 220 to the tip tool 270, the piston member 276 is pushed to a left side in FIG. 20. Then, when the piston member 276 is pushed out to the left side in FIG. 20, the base member 278 also moves in a left direction in FIG. 20, so that the blades 272 and 274 rotate in the arrow direction in FIG. 21 around the axis 275. In this manner, after placing the object to be cut by the tip tool 270 between the pair of blades 272, 274, the pressurized oil is sent from the hydraulic pump 220 to the tip tool 270 so that each blade 272, 274 is rotated about the axis 275 in the direction of the arrow shown in FIG. 21, and then the object can be cut.

More specifically, in the tip tool 270, the oil chamber 277 is formed inside the piston member 276. When the pressurized oil is sent from the third oil passage 250 to the oil chamber 277, the piston member 276 moves to the left side in FIGS. 20 to 23. The oil chamber 279 is also provided outside the piston member 276. When the pressurized oil is sent from the fourth oil passage 252 to the oil chamber 279, the piston member 276 moves to a right side in FIGS. 20 to 23.

As shown in FIGS. 21 to 23, the hole 240 into which the spool 88 of the switching part 80 is inserted is provided in the hydraulic actuator 210, and the oil passages 230, 232, 250 and 252 described above are respectively communicated with the hole 240. A plurality of grooves (second grooves) extending along a circumferential direction of the hole 240 are also formed on a peripheral wall of the hole 240. When the operation knob mounting part 84 is located at the neutral position, several grooves are blocked by the outer wall portions 88f, 88g of the spool 88. On the other hand, when the operation knob mounting part 84 is positioned at the forward position or the backward position, all the grooves are opened without being blocked by the respective outer wall portions 88f, 88g of the spool 88. In addition, in the present embodiment, the position of the spool 88 in the vertical direction in FIGS. 20 to 23 changes depending on the positions of the operation knob 82 and the operation knob mounting part 84. Therefore, the oil passage communicating with each of the first oil passage 230 and the second oil passage 232 is switched to either the third oil passage 250 or the fourth oil passage 252.

Next, an operation of the hydraulic actuator 210 having such a configuration will be described below.

First, an operation when the object is cut by the tip tool 270 will be described with reference to FIG. 21. When the object is cut by the tip tool 270, the operator turns the operation knob 82 so that the operation knob 82 moves from the neutral position to the forward position. Specifically, when the hydraulic actuator 210 is on standby, the operation knob 82 is located at the neutral position, and the projecting portion 82a of the operation knob 82 is oriented upward as shown in FIG. 20. From this state, when the operator turns the operation knob 82 in the counterclockwise direction in FIG. 20 so that the operator knocks down the projecting portion 82a to the left in FIG. 20, the operation knob 82 is positioned at the forward position. Also, when the operation knob 82 is turned to the forward position, the operation knob mounting part 84 also rotates integrally, so that the tip portion of the bolt 92 relatively moves inside the lead groove 89. As a result, the spool 88 moves in an upward direction in FIG. 21 along the axis direction. In this way, when the spool 88 moves upward in FIG. 21 along the axis direction, the positions of the respective grooves 88a, 88b, 88c provided on the outer circumferential surface of the spool 88 change, and the groove of the peripheral wall of the hole 240 that has been blocked by the spool 88 is opened. As a result, the first oil passage 230 and the third oil passage 250 as a feed pipe communicate with each other (see FIG. 21). Therefore, when the hydraulic pump 220 is operated and the pressurized oil is sent from the oil chamber 228 of the hydraulic pump 220 to the first oil passage 230, the pressurized oil is sent from the third oil passage 250 to the oil chamber 277 of the tip tool 270. When the pressurized oil is sent from the third oil passage 250 to the oil chamber 277 in this manner, the piston member 276 moves to the left side in FIG. 21 and the base member 278 advances to the left direction in FIG. 21. As a result, each blade 272, 274 rotates in a direction of an arrow shown in FIG. 21 about the axis 275 and the object can be cut by each blade 272, 274.

Also, when the spool 88 moves in the upward direction in FIG. 21 along the axis direction, the positions of the grooves 88a, 88b, 88c provided on the outer peripheral surface of the spool 88 are changed, and the groove of the peripheral wall of the hole 240 that has been blocked by the spool 88 is opened. As a result, the second oil passage 232 and the fourth oil passage 252 serving as the return pipe communicate with each other (see FIG. 21). Therefore, the return oil sent from the oil chamber 279 provided outside the piston member 276 in the tip tool 270 to the fourth oil passage 252 is returned from the second oil passage 232 to the oil chamber 228 of the hydraulic pump 220.

Next, an operation of stopping the piston member 276 and the base member 278 in the tip tool 270 will be described with reference to FIG. 22. When stopping the piston member 276 and the base member 278 in the tip tool 270, the operator turns the operation knob 82 so that the operation knob 82 moves to the neutral position. Specifically, the operator turns the operation knob 82 so that the projecting portion 82a of the operation knob 82 is oriented upward as shown in FIG. 20. When the operation knob 82 is turned to the neutral position, the operation knob mounting part 84 also rotates together, and the spool 88 also is positioned at the center position. At this time, as shown in FIG. 22, some of the plurality of grooves extending along the circumferential direction of the peripheral wall of the hole 240 are blocked by the outer wall portions 88f, 88g of the spool 88. The groove blocked by the outer wall portions 88f, 88g of the spool 88 communicates with the third oil passage 250 and the fourth oil passage 252, respectively. Therefore, as the groove communicating with the third oil passage 250 and the fourth oil passage 252 is blocked by the outer wall portions 88f, 88g of the spool 88, the third oil passage 250 and the fourth oil passage 252 do not communicate with the first oil passage 230 and the second oil passage 232, respectively. As a result, the pressurized oil is not sent from the third oil passage 250 and the fourth oil passage 252 to the oil chambers 277, 279 of the tip tool 270, so that the piston member 276 and the base member 278 cannot be moved.

Next, with reference to FIG. 23, description will be given on an operation when retreating the piston member 276 and the base member 278 in the tip tool 270 to return each opening member 272, 274 to the original position. When returning the tip tool 270 to the initial state, the operator turns the operation knob 82 so that the operation knob 82 moves from the neutral position to the backward position. Specifically, when the operator turns the operation knob 82 in the clockwise direction in FIG. 20 so that the operator knocks down the projecting portion 82a to the right in FIG. 20, the operation knob 82 is positioned at the backward position. When the operation knob 82 is turned to the backward position, the operation knob mounting part 84 also rotates integrally, and the tip portion of the bolt 92 relatively moves inside the lead groove 89. As a result, the spool 88 moves in a downward direction in FIG. 23 along the axis direction. In this way, when the spool 88 moves in the downward direction in FIG. 23 along the axis direction, the positions of the respective grooves 88a, 88b, 88c provided on the outer circumferential surface of the spool 88 are changed, and the groove of the peripheral wall of the hole 240 that has been blocked by the spool 88 is opened. As a result, the first oil passage 230 and the fourth oil passage 252 serving as the feed pipe communicate with each other (see FIG. 23). Therefore, when the hydraulic pump 220 is operated and the pressurized oil is sent from the oil chamber 228 of the hydraulic pump 220 to the first oil passage 230, the pressurized oil is sent from the fourth oil passage 252 to the oil chamber 279 of the tip tool 270. When the pressurized oil is sent from the fourth oil passage 252 to the oil chamber 279, the piston member 276 moves to the right side in FIG. 23 and the base member 278 moves to the right direction in FIG. 23. As a result, each blade 272, 274 is rotated about the axis 275 in a direction separating from each other and the tip tool 270 can be returned to the initial state.

Further, when the spool 88 moves in the downward direction in FIG. 23 along the axis direction, the positions of the respective grooves 88a, 88b, 88c provided on the outer circumferential surface of the spool 88 are changed, and the groove of the peripheral wall of the hole 240 that has been blocked by the spool 88 is opened. As a result, the second oil passage 232 and the third oil passage 250 as the return pipe communicate with each other (see FIG. 23). Therefore, the return oil sent from the oil chamber 277 of the tip tool 270 to the third oil passage 250 is returned from the second oil passage 232 to the oil chamber 228 of the hydraulic pump 220.

In the hydraulic actuator 210 as shown in FIGS. 20 to 23, only by the operator turning the operation knob 82, the spool 88 moves forward or backward in the direction orthogonal to the direction in which the operation knob 82 is turned. Therefore, it is possible to switch the route of at least one of the pressurized oil and the return oil in the oil passage. For this reason, the mechanism for switching the routes of the pressurized oil and the return oil in the oil passage is not complicated, so that the hydraulic actuator 210 can be made compact and inexpensive with a simple configuration.

What is claimed is:

1. A hydraulic actuator comprising:
a hydraulic pump that generates pressurized oil;
a tool that is operated by the pressurized oil generated by the hydraulic pump;
an oil passage for sending the pressurized oil generated by the hydraulic pump to the tool and returning return oil from the tool to the hydraulic pump;
a switching part provided with the oil passage and configured to switch a route of at least one of the pressurized oil and the return oil, wherein
the switching part includes an operating portion and an axis portion that advances or retreats when the operating portion is turned, and
when the operating portion is turned, the axis portion advances or retreats in a direction orthogonal to a direction of turning the operating portion, whereby the route of at least one of the pressurized oil and the return oil in the oil passage is switched.

2. The hydraulic actuator as claimed in claim 1, wherein the switching part further comprises a converting member for converting a rotational movement of the operating portion into an advancing and retreating movement of the axis portion.

3. The hydraulic actuator as claimed in claim 2, wherein the operating portion, the converting member and the axis portion rotate to be in a same phase,
a lead groove extending in a direction inclined with respect to a circumferential direction and an advancing and retreating direction of the axis portion is formed on an outer peripheral surface of the axis portion, and
a fixing member provided in a fixed position is inserted in the lead groove.

4. The hydraulic actuator as claimed in claim 1, wherein the axis portion of the switching part is provided with a first groove extending along a circumferential direction of the axis portion, and
when the axis portion advances or retreats by turning the operating portion, the route of at least one of the pressurized oil and the return oil in the oil passage is switched by changing the position of the first groove.

5. The hydraulic actuator as claimed in claim 1, wherein a hole into which the axis portion of the switching part is inserted is formed in a main portion of the hydraulic actuator,
a groove extending along a circumferential direction of the hole is provided on a peripheral wall of the hole, and
when the axis portion advances or retreats by turning the operating portion, the route of at least one of the pressurized oil and the return oil in the oil passage is switched by opening the groove that has been blocked by the axis portion or blocking the groove by the axis portion.

* * * * *